Patented July 10, 1951

2,560,333

UNITED STATES PATENT OFFICE 2,560,333

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application November 12, 1948, Serial No. 59,768

10 Claims. (Cl. 252—331)

This invention relates to processes or procedures particularly adapted for preventing, breaking or resolving emulsions of the water-in-oil type, and particularly petroleum emulsions.

Complementary to the above aspect of our invention is our companion invention concerned with the new chemical products or compounds used as the demulsifying agents in said aforementioned processes or procedures, as well as the application of such chemical compounds, products and the like, in various other arts and industries, along with the method for manufacturing said new chemical products or compounds which are of outstanding value in demulsification. See our co-pending application Serial No. 59,767, filed November 12, 1948.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component. Reference is made to our co-pending applications Serial No. 8,722 and Ser. No. 8,723, both filed February 16, 1948, now Patents No. 2,499,365 and 2,499,366, respectively, both dated March 7, 1950.

Briefly stated, the present invention in one of its more important aspects, is concerned with the resolution of water-in-oil emulsions by means of certain oxyalkylated resins hereinafter described.

The resins herein described as suitable for use as raw materials for the manufacture of oxyalkylated derivatives, are obtained from phenols and acetylene or acetylene homologues, with or without further reaction with the aldehydes, etc.

The most outstanding compounds herein described are those which are derived from a difunctional phenol, particularly one having at least 4 and not over 18 carbon atoms in the substituent radical. This is particularly true when the substituent radical is a hydrocarbon radical.

A variety of resins can be obtained from phenols and acetylene or its polymers. The exact nature of the resins vary for obvious reasons. For instance, in the presence of water, acetylene may be converted into acetaldehyde, and the resulting product may be comparable to the same product obtained from acetaldehyde instead of acetylene. See U. S. Patent No. 1,742,519, dated January 7, 1930, to Schrimpe, or German patent No. 422,904, dated December 15, 1925. In addition to using acetylene, one may use an aliphatic polymer of acetylene, such as vinylacetylene, divinylacetylene, or the like. See U. S. Patent No. 2,322,990, dated June 29, 1943, to Wolfram.

It may be well to emphasize that the resins employed as raw materials are differentiated from the conventional phenol aldehyde resins in the matter of structure, and particularly by the fact that the phenolic nuclei are attached to different carbon atoms instead of the same carbon atom. This may be restated in a simplified manner, as follows: If acetylene were converted into acetaldehyde and reacted with phenols, a structure involving the linkage would be an ethylidine structure, by virtue of the divalent radical which comes into existence, due to the removal of an oxygen atom attached to a carbon atom. When acetylene reacts in the manner subsequently described, the triple bond is converted into a double bond with the formation of an ethylene group. Therefore, the resins used as raw materials are characterized by the fact that they are free from any linkage involving a single carbon atom, as in the typical phenol-aldehyde linkage, except where phenol-acetylene resins have been further reacted with an aldehyde to give a more complex structure.

For purpose of what is said hereinafter, it may be well to note that the resins may be divided into seven classes:

Class 1.—Resins obtained from acetylene or acetylene polymers and phenols which are at least as trifunctional as ordinary phenol (hydroxybenzene), metacresol, bisphenol A, and free from a long chain meta-substituent as in the case of cardanol, side-chain hydrogenated cardanol, and a resorcinol derivative of a structure comparable to the following, wherein RCO is the acyl radical of a monocarboxy acid:

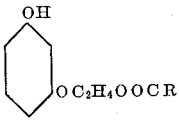

Class 2.—Resins obtained from acetylene or acetylene polymers and phenols whose functionality is less than in the previous class, particularly difunctional phenols such as paracresol, para-amylphenol, para-butylphenol, para-octylphenol, para-nonylphenol, etc.

Class 3.—The same as class 2, but includes additionally the after-treatment with an aldehyde so as to yield a more complicated resin.

Class 4.—An organic solvent-soluble phenolaldehyde resin derived from a trifunctional phenol and an aldehyde, is subjected to an after-treatment with acetylene or an acetylene polymer, so as to yield a more complicated resin.

Class 5.—This includes acetylene resins derived from difunctional phenols having a long chain meta-substituent, particularly 8 carbon atoms, or more, as in the case of cardanol, hydrogenated cardanol, and a resorcinol derivative, as previously described.

Class 6.—This is the same as class 5, but includes additionally the after-treatment with an aldehyde so as to yield a more complicated resin.

Class 7.—A phenol-aldehyde resin derived from a phenol having a long chain meta-substituent, such as previously enumerated, and an aldehyde is subjected to an after-treatment with acetylene or an acetylene polymer so as to yield a more complicated resin.

Needless to say, mixtures of various phenols can be employed, and in fact, mixtures of phenols and resins. All of this will become obvious in light of what is said subsequently.

Our preferred reactants are obtained from difunctional phenols having 4 to 18 carbon atoms in the substituent group with or without subsequent reaction with an aldehyde having 1 to 8 carbon atoms, such as acetaldehyde, formaldehyde, propionaldehyde, butyraldehyde, benzaldehyde, heptaldehyde, and octaldehyde.

Having obtained resins of the kind described, such resins are subjected to oxyalkylation by treatment with an alkylene oxide having not over 4 carbon atoms in the presence of an alkaline catalyst so as to render the derivatives distinctly hydrophile and preferably water-soluble. The nature of the hydrophile character and the surface-activity of such derivatives will be described in greater detail subsequently. The alkylene oxides employed are ethylene oxide, propylene oxide, butylene oxide, glycide and methylglycide. For convenience, what is said hereinafter will be divided into four parts, as follows:

Part 1.—Nature of phenol-acetylene resins.
Part 2.—Preparation of such resins.
Part 3.—Oxyalkylation of such resins.
Part 4.—Use of such oxyalkylated derivatives in breaking oil field emulsions.

PART 1

As has been pointed out previously, resins obtained by reaction between a phenol and acetylene or its polymers, may be reacted further with an aldehyde, as described. See U. S. Patent No. 2,322,990, dated June 29, 1943, to Wolfram et al., and British Patent No. 232,277, dated April 20, 1925.

As to the manufacture of resins from phenols and acetylene, see U. S. Patents Nos. 2,072,825, dated Mar. 2, 1937, to Reppe et al.; 2,027,199, dated January 7, 1936, to Reppe et al.; and 2,337,464, dated December 21, 1943, to Hecht et al.; and German Patents Nos. 645,112, dated May 21, 1937, and 642,886, dated March 18, 1937; also British Patent No. 413,640, dated July 16, 1934. See also PB-27444, PB-52007 and PB-78672, distributed by the Office of Publication Board, U. S. Department of Commerce. The first-mentioned PB report is entitled "Manufacture of Koresin in Germany," by G. M. Kline; PB-52007, pages 37, 67, is entitled "Contribution Toward the Progress of Acetylene Chemistry, by the Ludwigshafen Works of I. G. Farbenindustrie Akt. Ges.," and the last-mentioned report is entitled "The Preparation of Oil-Soluble Phenol-Acetylene Resins for Use in Surface Coatings," by John F. Rooney. Also see a copy of paper entitled "Acetylene Chemistry," by W. E. Hanford, presented at the American Chemical Society Meeting in Chicago, September 11, 1946. Attention is particularly directed to the very complete description of equipment and process for the manufacture of resins of the kind herein specified as it appears in PB-70059, entitled "Operating Directions for the Preparation of Koresin." See also Ind. & Eng. Chem., 40, No. 7 (July 1948), 1171.

The hardening or curing of phenol-acetylene resins, when properly selected and prepared, may be due to a number of different mechanisms. Some of the resins prepared from phenol or metacresol or mixtures having a preponderance of the same, may yield types comparable to novolaks or resoles. Such types of materials may cure or harden by the action of heat or the action of added reactive aldehyde, or both. Furthermore, resins may be obtained which are somewhat comparable to dihydroxydiphenyldimethyl methane (obtained from phenol and acetone) and susceptible to hardening under the same circumstances.

Reference is made to aforementioned U. S. Patent No. 2,072,825, dated March 2, 1937, to Reppe and Keyssner. This patent points out that one may react one molar proportion of phenol with approximately four molar proportions of acetylene. The fact that one mole of phenol can combine with such plurality of moles of acetylene, is a clue to the complexity of the resultants obtained by various reactions involving various phenols, i. e., trifunctional phenols, difunctional phenols, and tetrafunctional phenols with acetylene or acetylene polymers in various molar proportions and in the presence of various catalysts with or without the presence of moisture, and with or without subsequent reaction with an aldehyde. For instance, the simplest reaction with phenol and acetylene might yield either one of the two following structures:

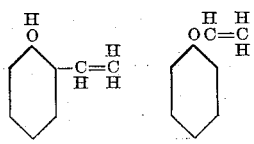

If a vinyl ether were formed, as suggested by certain of the above structures, there is reason to believe there would be a migration so as to yield the ortho-vinyl phenol of the following structure:

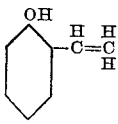

Comparison of a resin obtained from acetylene and a comparable resin obtained from an ortho-vinyl phenol in which the vinylation process is a vinyl condensation, would appear to indicate that two different types of resins are involved and this reaction probably does not represent the mechanism involved. It would seem that a resin obtained by vinyl condensation would contain at least three carbon atoms connecting the phenolic nuclei in even the simplest structure. This may be illustrated in the following manner:

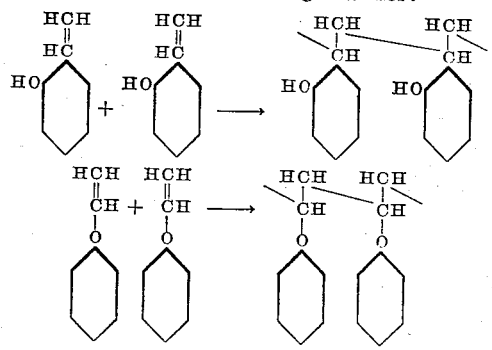

The best evidence seems to bear out the views of Reppe (see "Manufacture of Koresin in Germany," v. s.) which is best explained by the assumption that the ortho-vinyl phenol reacts as an intermediate involving a nuclear hydrogen atom, and the corresponding radical resulting from such hydrogen atom or proton removal.

As has been previously pointed out, a structure of such intermediate may be indicated by the following formula:

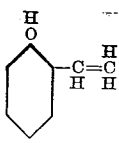

However, it appears probable that the other two reactive hydrogen positions, i. e., the other ortho position and the para position, would be just as reactive, and thus it is quite possible that under the proper conditions a plurality of acetylene radicals might enter, corresponding in their simplest representation to the following:

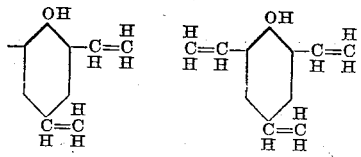

For instance, if the introduction of a mole of acetylene results in the formulation of a vinyl ether or a vinyl phenol, it is perfectly obvious that another molecule of acetylene may act in the conventional manner, as indicated by the following reaction:

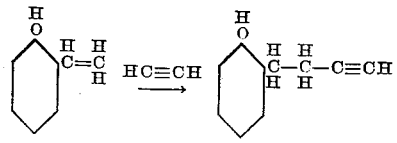

If one assumes a fairly simple structure involving two moles of acetylene and one mole of phenol and assuming that one mole of acetylene forms the ether, the other mole enters the para position, the other intermediate form is as follows:

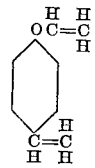

The applicants have had considerable experience in the field of phenol-aldehyde resins and have prepared a large number of resins from phenols and acetaldehyde. They have also had some experience with vinyl phenol resins and experience with at least certain phenol-acetaldehyde resins. Assuming that one starts with butyl or tertiary amylphenol, and that in its simplest aspect the stable intermediate is the following:

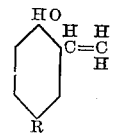

applicants are inclined to believe that this intermediate acts by polymerization condensation so that the structural unit becomes the following:

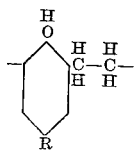

It will be noted that this view is in agreement with what some authorities have stated in light of what appears subsequently. See also Chemical Industries, volume 62, No. 3 (1948), page 389, and what is said as to the structure of these resins in Report PB-65142. Also see Journal of American Chemical Society, 70, No. 5, 1776 (1948).

A mere examination of what appears in the literature, particularly the patent literature, as to the numerous variety of phenol-acetylene resins which can be prepared, particularly in light of what has been said briefly preceding, indicates that such resins may vary in structure over an exceedingly wide range, probably as wide or even wider than the range of phenolic aldehyde resins, for the reason that the former involve condensation only (splitting off a small molecule, particularly water), whereas, phenol-acetylene resins considered generically include those which are subjected to an after-treatment with an aldehyde, and thus may involve polymerization alone or polymerization and condensation. It is not intended to include within the generic class of phenol-acetylene resins those in which the acetylene is obviously converted into acetaldehyde, the final product is obviously a phenol-acetaldehyde resin.

It has been found that certain narrow classes of phenol-acetylene resins may have application in some particular field. Reference is made to U. S. Patent No. 2,337,464, dated December 21, 1943, to Hecht, Prillwitz and Dane. This patent is concerned with composite rubber articles containing, as a binding agent for securing adhesion of rubber onto rubber, a product of the interaction of acetylene and a mono-nuclear monovalent alkylated phenol, in which the molecular ratio between the phenol and the acetylene is substantially 1:0.3–2.5.

If one takes the comparative narrow class of phenolacetylene resins therein contemplated and narrows it down to a considerably greater degree, one defines the preferred phenol-acetylene resins contemplated herein as reactants. For instance, instead of using any alkylated phenol as a raw material, we have limited the preferred phenolic raw material to difunctional phenols, in which the substituent radical contains at least 4 and not more than 18 carbon atoms, and preferably, not more than 12 carbon atoms.

Such resins are prepared from difunctional phenols, such as para or ortho-substituted phenols, particularly para-butylphenol, para-amylphenol, para-hexylphenol, para-octylphenol, para-nonylphenol, para-decylphenol, para-dodecylphenol, and para-octadecylphenol. As a rule, the side chains are branched in the majority of the available phenols. Other suitable phenols include phenylphenol, cyclohexylphenol, benzylphenol, menthylphenol, styrylphenol, etc. There is no objection, of course, to the presence of side chains in the meta position, as, for example, one may employ the comparable analogues of metacresol instead of the hydroxybenzene derivative.

As is pointed out in PB–78672 phenol acetylene resins have been prepared from trifunctional phenols, and particularly difunctional phenols up to and including para-dodecylphenol. These included, among others, terpene phenols.

Furthermore, the preferred class of resins employed as raw materials, is restricted to those obtained by the action of acetylene on a preferred difunctional phenol of the kind specified previously. The combining molar ratio is approximately one to one, instead of the broader limits indicated in the aforementioned U. S. Patent No. 2,337,464. Furthermore, the preferred resins must be soluble in aromatic solvent, although this does not necessarily apply to the resins contemplated in the aforementioned U. S. Patent No. 2,337,464.

As to the manufacture of these resins, attention is directed to the patents previously cited, as well as the article entitled "Manufacture of Koresin in Germany." Also see Technical Industrial Intelligence Division Report No. 949 entitled "Investigation of German Plastics Plants."

As generically descriptive of the process of manufacturing such resins, attention is directed to the following excerpt from the article entitled "Manufacture of Koresin in Germany," by G. M. Kline;

"Koresin is a synthetic resin made by I. G. Farbenindustrie A. G. during the war for use as a tackifier for synthetic rubber. The product is made by the reaction of acetylene (6 moles) and p-tertiary-butylphenol (5 moles) in the presence of zinc naphthenate, according to a reaction discovered by Dr. W. Reppe. The compound is thought to have the fololwing structure:

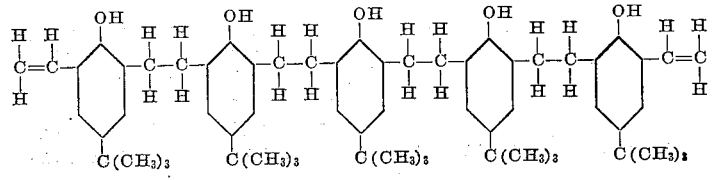

"The resin is made in an autoclave lined with stainless steel, although it is claimed that iron is satisfactory. The autoclave is built to withstand 300 atm. pressure. . . .

"The p-tertiary-butylphenol is stored in heated tanks and conveyed through heated pipe-lines to a measuring device which delivers the desired amount of the phenol to a steam-heated mixing tank. The catalyst, zinc naphthenate, is melted, measured, and delivered to the mixing tank. The quantities for a single batch are 800 kg. of the phenol to 68 kg. of zinc naphthenate.

"The mixture of phenol and catalyst is heated to 100–120° C. under a pressure of 10–20 mm. of mercury to remove moisture. It is then forced by nitrogen under pressure (2 atm.) into the autoclave which has a capacity of 1500 liters. The autoclave is steam-jacketed and heated to 210–220° C. by steam at 20 atm. pressure. The mixture in the autoclave is stirred and all air swept out by nitrogen.

"The acetylene is then pumped into the autoclave. The addition of acetylene is so arranged that the total amount, 200 kg., is introduced over a period of from 14 to 16 hours. The pressure at the start is 10 atm. at a temperature of 180° C., but during the course of the reaction, the pressure rises to 20–22 atm. and the temperature to 230–235° C. When the required amount of acetylene has been added, the mixture is stirred for a further hour. The molten product is then discharged by the pressure in the autoclave to a vessel in which it is stirred to remove unreacted acetylene. The resin is then either run into barrels of 125 kg. capacity, or solidified, ground, and packaged in bags of 75 kg. capacity. It has a melting point of 120–130° C. The output of Koresin was 40–50 tons per month per autoclave of 1500-liter capacity. Three such units were in use. The yield was 93–94%, based on the total components."

(The word "Koresin" is the trade-mark employed to describe certain resins manufactured by the General Aniline & Film Corporation.)

We are aware that other suggestions have been made in regard to the composition of these resins (Hanford, v. s.), but we are inclined to accept a modified Reppe formulation, although we have been unable to ascertain that there are terminal vinyl radicals present, or if present, that they show conventional unsaturation.

The fact that these products do not show many of the typical reactions of unsaturated aliphatic compounds, has lead to the belief that in many cases the composition of the resin is best depicted by a structure involving the same number of phenolic nuclei, but two less acetylene nuclei. Such structure is indicated by the following formula, and naturally, is not susceptible to the reactions involving aliphatic unsaturation, but is susceptible, of course, to nuclear hydrogenation.

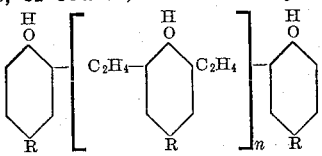

The above formula, of course, represents a simplification, in that one might employ ortho-substituted phenols, as well as para-substituted phenols, i. e., any difunctional phenol, provided the substituent R contains at least 4 and not more than 18 carbon atoms. As previously pointed out, it is preferable that R contain 4 to 12 carbon atoms.

The most important and preferred type of compound, particularly for use as a demulsifier, are those obtained from difunctional phenols, particularly para-substituted phenols having at least 4 and not more than 12 carbon atoms in the substituent. Assuming the simplest structure which has been suggested and which we have adopted, based on our own experience, one useful type of compound obtained by the oxyalkylation of such resin, may be exemplified in an idealized simplification, by the following formula:

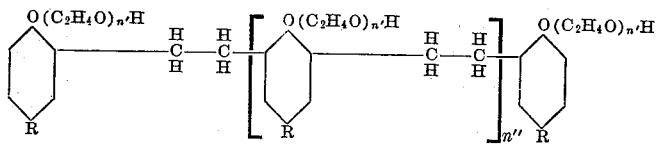

which, in turn, is considered a derivative of the fusible, organic solvent-soluble resin polymer:

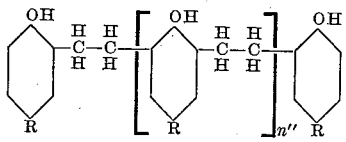

In these formulae $n''$ represents a numeral varying from 1 to 13, or even more, provided the parent resin is fusible and organic solvent-soluble; $n'$ represents a numeral varying from 1 to 20, with the provisio that the average value of $n'$ be at least 2; and R is a hydrocarbon radical having at least 4 and not over 18 carbon atoms. These numerical values of $n'$ and $n''$ are, of course, on a statistical basis.

More particularly, the present invention involves the use, as a demulsifier, of a compound having the following characteristics:

(1) Essentially a polymer, probably linear but not necessarily so, having at least 3 and preferably not over 15 or 20 phenolic or structural units. It may have more, as previously noted.

(2) The parent resin polymer being fusible and organic solvent-soluble, as hereinafter described.

(3) The parent resin polymer being free from cross-linking, or structure which cross-links during the heating incident to the oxyalkylation procedure to an extent sufficient to prevent the possession of hydrophile or sub-surface-active or surface-active properties by the oxyalkylated resin.

(4) Each alkyleneoxy group is introduced at the phenolic hydroxyl position, except possibly, in an exceptional instance, where a stable methylol group has been formed by virtue of resin manufacture in presence of an alkaline catalyst. Such occurrence of a stable methylol radical is the exception rather than the rule, and in any event, apparently does not occur when the resin is manufactured in the presence of an acid catalyst.

(5) The total number of alkyleneoxy radicals introduced must be at least equal to twice the phenolic nuclei.

(6) The number of alkyleneoxy radicals introduced not only must meet the minimum of item (5) above, but must be sufficient to endow the product with sufficient hydrophile property to have emulsifying properties, or be self-emulsifiable, or self-dispersible, or the equivalent, as hereinafter described. The invention is concerned particularly with the use of sub-surface-active and surface-active compounds.

(7) The use of a product derived from a para-substituted phenol is advantageous as compared with the use of a product derived from an ortho-substituted phenol, when both are available. This preference is based, in part, on the fact that the para-substituted phenol is usually cheaper, and also where we have been able to make a comparison, it appears to be definitely better, in improving the effectiveness of demulsifiers.

Due to the obvious inability to indicate a proven structural formula of all the resins herein specified as raw materials, we have had to resort to the method of manufacture as the most suitable description to present the broadest aspect.

Attention is directed to the fact that phenol-acetylene resins, particularly the butylphenol-acetylene resin, are offered for sale in the United States in the open market. We believe that all the resins here employed as raw materials to be subjected to oxyalkylation, are characterized by the fact that either partially or totally, the structure includes linkages where the phenolic nuclei are attached to different carbon atoms, as differentiated from resins obtained solely from aldehydes or aldehydes and ketones, where two phenolic nuclei are attached to the same carbon atom.

PART 2

*Preparation of phenol-acetylene and phenol-acetylene-aldehyde, and phenol-aldehyde-acetylene resins*

EXAMPLE 1

500 parts of phenol and 20 parts of cyclohexylamine are charged into a rotary autoclave. The autoclave is rinsed with nitrogen, and then filled with nitrogen until the pressure is 5 atmospheres and then with acetylene until the pressure is 15 atmospheres. The autoclave is then heated to 180° C. and acetylene is pressed in while keeping the pressure at 20 atmospheres until about 90 parts of acetylene have been absorbed. The resulting product is purified by solution in benzene and treatment of the solution with from about 5 to about 15% of bleaching earth. After distilling off the benzene, a resin having a softening point of 150° C. remains behind.

EXAMPLE 2

500 parts of phenol and 20 parts of cyclohexylamine are treated with acetylene in the manner described in Example 1 until 115 parts of acetylene have been absorbed. The resulting brown colored but clear resin is insoluble in the usual solvents such as benzene, benzine, ethyl alcohol, acetone and diethylether. It softens when heated without melting.

EXAMPLE 3

500 grams of commercial xylenol (mixture of isomers) and 20 parts of mono-n-butylamine are treated with acetylene, as described in Example 1, until 145 grams of acetylene have been absorbed. The product has a softening point of 95° C. after purification with bleaching earth, as described in Example 1.

EXAMPLE 4

500 parts of phenol and 20 parts of piperidine are treated with acetylene in the manner described in Example 1 until 120 parts of acetylene have been absorbed. The brown resin obtained is insoluble in benzine and benzene and soluble in ethyl alcohol, acetone and aqueous solutions of sodium hydroxide.

EXAMPLE 5

500 parts of phenol and 20 parts of monoethanolamine are treated with acetylene in the manner described in Example 1 until acetylene is no longer absorbed. The resin obtained softens without melting, when heated. It is partly soluble in acetone.

As to the preceding five examples, see aforementioned U. S. Patent No. 2,027,199, dated January 7, 1936, to Reppe et al.

EXAMPLE 6

1000 parts of phenol and 20 parts of zinc acetate are introduced into a stirring autoclave. The autoclave is freed from air by means of nitrogen, then filled with nitrogen until the pressure is 5 atmospheres, acetylene finally being pressed in until the pressure is 10 atmospheres. The nitrogen is for the purpose of avoiding explosions. The whole is heated to 180° C., the pressure in the autoclave thus increasing to about 20 to 25 atmospheres. When the reaction has commenced and the pressure has consequently subsided to a few atmospheres, acetylene is again pressed in. This procedure is repeated until from 240 to 260 parts of acetylene have been absorbed. The reaction product may be allowed to run out while hot, or may be withdrawn cold. A hard resin is thus obtained, which is soluble in organic solvents, such as acetone, ether, alcohol and benzene, and in caustic soda, but insoluble in benzine and oil of turpentine.

In order to remove zinc from the reaction product, the latter is dissolved in 3000 parts of benzene while heating and stirred with 160 parts of bleaching earth. The bleaching earth is then filtered off and the benzene distilled, at first at a slightly reduced pressure, and finally in a vacuum of from 15 to 20 millimeters (mercury gauge), the temperature being raised slowly to 230° C. Towards the end of the distillation, the unconverted phenol contained in the crude product passes over. The resin is poured out from the distillation vessel while still hot. After cooling, it forms hard, clear pieces having a softening point of from 100° to 130° C., depending upon the periods of heating applied in the process.

EXAMPLE 7

1000 parts of phenol, 10 parts of zinc acetate and 10 parts of cadmium acetate are treated with about 230 parts of acetylene, as described in Example 6. The resulting reaction product is purified by dissolution in benzene and treatment with bleaching earth, as described in Example 6. After distilling off the benzene, a resin is obtained having a softening point of 128° C.

EXAMPLE 8

1000 parts of phenol and 20 parts of cadmium acetate are treated with acetylene, as described in Example 6, until the reaction product has absorbed 300 parts of acetylene. A semi-soft resin is obtained which is readily soluble in benzene and acetone, but insoluble in alcohol and caustic soda solution.

EXAMPLE 9

1000 parts of cresol and 40 parts of zinc acetate are treated with about 200 parts of acetylene and purified as described in Example 6. A resin is obtained which is very similar to the product obtained from phenol, but which dissolves in oil of turpentine.

If, instead of cresol, commercial xylenol be employed, a resin is obtained which is also soluble in ligroin.

EXAMPLE 10

A mixture of 520 parts of o-chlorphenol and 20 parts of zinc acetate are treated as described in Example 1 until saturated with acetylene, which is the case after absorption of about 225 parts of acetylene. A dark resin is obtained which is insoluble in alcohol and caustic soda solution, but soluble in benzene, acetone, and ether.

When treating p-chlorphenol with acetylene in the same manner, the mixture is already saturated after the absorption of 140 parts of acetylene. The product resembles the resin obtained from o-chlorphenol, but is soluble in alcohol.

EXAMPLE 11

100 parts of 4-hydroxydiphenyl and 6 parts of zinc acetate are treated in a shaking autoclave with acetylene at 190° C., as described in Example 6, until about 17 parts of acetylene are absorbed. The product obtained is a resin having a softening point of about 135° C. and is readily soluble in fatty oils.

EXAMPLE 12

100 parts of tertiary p-butylphenol and 10 parts of zinc acetate are treated with acetylene at 210° C. in a shaking autoclave, as described in Example 1, until the absorption of acetylene takes place but slowly. Thus, about 15 parts of acetylene are absorbed. A clear resin is thus obtained which after purification with bleaching earth has a softening point between about 95° and 100° C. and is soluble in benzine.

EXAMPLE 13

100 parts of resorcinol and 6 parts of zinc acetate are treated between about 180° and 190° C. with acetylene, as described in Example 1, until about 20 parts of acetylene are taken up. A brown-red resin is obtained which is insoluble in benzene, and benzine, but readily soluble in caustic soda solution, alcohol and acetone.

By treating α-naphthol with acetylene in the same manner, a dark resin is obtained which is readily soluble in benzene and acetone, partly soluble in alcohol and caustic soda solution and soluble in benzine.

EXAMPLE 14

100 parts of dihydroxy-diphenyl-dimethylmethane and 5 parts of zinc acetate are acted upon with acetylene at about 190° C. in a shaking autoclave, as described in Example 1, until from 10 to 11 parts of acetylene are taken up. A resin is obtained having a softening point of 130° C. which is insoluble in benzene and benzine, but soluble in acetone and alcohol.

EXAMPLE 15

1000 parts of tetrahydro-β-naphthol and 40 parts of zinc acetate are treated with acetylene at between 180° and 190° C. in a stirring autoclave, as described in Example 6, until about 110 parts of acetylene are absorbed. The resin thus obtained has a softening point of about 106° C. and is soluble in benzine.

As to the preceding ten examples, see aforementioned U. S. Patent No. 2,072,825.

EXAMPLE 16

The same procedure is followed as in Example 12, preceding, except that para-butylphenol is replaced by para-amylphenol in equal parts by weight.

EXAMPLE 17

The same procedure is followed as in Example 12, preceding, except that para-butylphenol is replaced by para-octylphenol in equal parts by weight.

EXAMPLE 18

The same procedure is followed as in Example 12, preceding, except that para-butylphenol is replaced by para-nonylphenol in equal parts by weight.

EXAMPLE 19

100 parts of the condensation product from phenol and divinyl-acetylene are dissolved, while heating, preferably in a closed vessel in ten times their weight of a caustic soda solution of 5% strength and condensed, for 6 hours at about 60° C. with 150 parts of a formaldehyde solution of 30% strength. A viscid solution is thus obtained.

EXAMPLE 20

100 parts of the condensation product from phenol and divinyl-acetylene are dissolved in 400 parts of alcohol and 10 parts of a caustic soda solution of 40° Baumé. 200 parts of a formaldehyde solution of 30% strength are then added, drop by drop, and the mixture is kept in a closed vessel at 60° C. to 70° C. for 3 hours. The darkbrown syrupy solution is concentrated under reduced pressure. After evaporation of the solvent in the drying oven at 110° C. there remains an elastic, transparent film.

EXAMPLE 21

500 parts of the condensation product from phenol and divinyl-acetylene are dissolved in 1600 parts of butanol and 50 parts of a caustic soda solution of 40° Baumé. 800 parts of a formaldehyde solution of 30% strength are then slowly run in and the whole is heated in a closed vessel for 30 hours at 60° C. to 70° C. Under reduced pressure, the mass is thickened to form a viscous product which may be used as a resin for casting.

EXAMPLE 22

300 parts of the condensation product from technical cresol and divinyl-acetylene are dissolved in 680 parts of a caustic soda solution of about 12% strength and the solution is then heated in a closed vessel for 3 hours at about 60° C. to 70° C., with 500 parts of a formaldehyde solution of 30% strength. The mixture which has become solid by the following day is stirred in dilute hydrochloric acid and the solid matter is filtered with suction and washed until neutral. After drying under reduced pressure, a voluminous, feebly yellowish powder is obtained.

EXAMPLE 23

100 parts of the condensation product from phenol and divinyl-acetylene are stirred with 400 parts of alcohol and 12 parts of concentrated hydrochloric acid until dissolution has occurred. 150 parts of a formaldehyde solution of 30% strength are then caused to run in and the whole is heated in a closed vessel for 24 hours at about 60° C. After concentrating under reduced pressure the solution containing the hydrochloric acid, a dark product is obtained, which, on drying above 100° C., likewise loses its solubility in alcohol and in alkalies.

EXAMPLE 24

100 parts of the condensation product from phenol and mono-vinyl-acetylene are dissolved in 300 parts of alcohol; 10 parts of a caustic soda solution of 40° Baumé are then added and the whole is heated in a closed vessel for 3 hours at 60° C., with 150 parts of a formaldehyde solution of 30% strength. The product thus obtained has properties similar to those of the product described in Example 20.

As to the preceding six examples, see U. S. Patent No. 2,322,990, dated June 29, 1943, to Wolfram et al.

Previous reference has been made to co-pending application Serial Nos. 8,722 and 8,723, filed February 16, 1948; see also our co-pending application Serial No. 8,730, filed February 16, 1948, now abandoned. The first two mentioned co-pending applications describe a large variety of organic solvent-soluble, fusible, phenolic resins, particularly phenol-aldehyde resins which can be subjected to after-treatment with acetylene to produce further change in composition and structure. The type of greatest interest in the instant application is obtained from difunctional phenols having at least 4 carbon atoms in the side chain and from anacardic acid phenols or the like, or mixtures of the same, or mixtures with other phenols, particularly hydroxy benzene, cresol, difunctional ethylphenol, difunctional propylphenol, etc.

As an example of the preparation of such phenols, particularly from difunctional phenols having 4 to 8 carbon atoms, reference is made to our aforementioned co-pending application Serial No. 8,731, filed February 16, 1948, now abandoned. The following examples are just a few selected from the above-mentioned co-pending application, which illustrate the manufacture of suitable organic solvent-soluble, fusible, phenol-aldehyde resins which are particularly advantageous for use as a raw material for after-treatment with acetylene so as to yield an intermediate susceptible to oxyalkylation.

It will be noted, for purposes of clarity, that the following resin examples which are subsequently subjected to after-treatment with acetylene or the like, are described as Examples 1a, 2a, 3a, etc.; in other words, they are identified by the suffix "a."

EXAMPLE 1a

| | Grams |
|---|---|
| Para-tertiary butylphenol (1.0 mole) | 150 |
| Formaldehyde 37% (1.0 mole) | 81 |
| Concentrated HCl | 1.5 |
| Monoalkyl ($C_{10}$–$C_{20}$, principally $C_{12}$–$C_{14}$) benzene monosulfonic acid sodium salt | 0.8 |
| Xylene | 100 |

(Examples of alkylaryl sulfonic acids which serve as catalyst and as emulsifiers particularly in the form of sodium salts include the following:

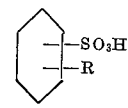

R is an alkyl hydrocarbon radical having 12–14 carbon atoms

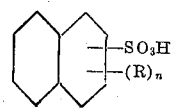

R is an alkyl radical having 3–12 carbon atoms and $n$ represents the numeral 3, 2 or 1, usually 2, in such instances where R contains less than 8 carbon atoms.

With respect to alkylaryl sulfonic acids or the sodium salts, we have employed a monoalkylated benzene monosulfonic acid or the sodium salt thereof, wherein the alkyl group contains 10 to 14 carbon atoms. We have found equally effective and interchangeable the following specific sulfonic acids or their sodium salts: A mixture of di- and tripropylated naphthalene monosulfonic acid; diamylated naphthalene monosulfonic acid; and nonyl naphthalene monosulfonic acid.)

The equipment used was a conventional two-piece laboratory resin pot. The cover part of the equipment had four openings: One for reflux condenser; one for the stirring device; one for a separatory funnel or other means of adding reactants; and a thermometer well. In the manipulation employed, the separatory funnel insert for adding reactants was not used. The device was equipped with a combination reflux and water-trap apparatus so that the single piece of apparatus could be used as either a reflux condenser or a water trap, depending on the position of the three-way glass stopcock. This permitted convenient withdrawal of water from the water trap. The equipment, furthermore, permitted any setting of the valve without disconnecting the equipment. The resin pot was heated with a glass fiber electrical heater constructed to fit snugly around the resin pot. Such heaters, with regulators, are readily available.

The phenol, formaldehyde, acid catalyst, and solvent were combined in the resin pot above described. This particular phenol was in the form of a flaked solid. Heat was applied with gentle stirring and the temperature was raised to 80–85° C., at which point a mild exothermic reaction took place. This reaction raised the temperature to approximately 105–110° C. The reaction mixture was then permitted to reflux at 100–105° C. for between one and one and one-half hours. The reflux trap arrangement was then changed from the reflux position to the normal water entrapment position. The water of solution and the water of reaction were permitted to distill out and collect in the trap. As the water distilled out, the temperature gradually increased to approximately 150° C. which required between 1.5 to 2 hours. At this point the water recovered in the trap, after making allowance for a small amount of water held up in the solvent, corresponded to the expected quantity.

The solvent solution so obtained was used as such in subsequent oxyalkylation steps. We have also removed the solvent by conventional means, such as evaporation, distillation or vacuum distillation, and we customarily take a small sample of the solvent solution and evaporate the solvent to note the characteristics of the solvent-free resin. The resin obtained in the operation above described was clear, light amber colored, hard, brittle, and had a melting point of 160–165° C.

EXAMPLE 2a

The same procedure was followed as in Example 1a preceding, and the materials used the same, except that the para-tertiary butylphenol was replaced by an equal amount of para-secondary butylphenol. The phenol was a solid of a somewhat mushy appearance, resembling moist cornmeal rather than dry flakes. The appearance of the resin was substantially identical with that described in Example 1a, preceding. The solvent-free resin was reddish-amber in color, somewhat opaque but completely xylene-soluble. It was semi-soft or pliable in consistency. See what is said in Example 1a, preceding, in regard to the opaque appearance of the resin. What is said there applies with equal force and effect in the instant example.

EXAMPLE 3a

| | Grams |
|---|---|
| Para-tertiary amylphenol (1.0 mole) | 164 |
| Formaldehyde 37% (1.0 mole) | 81 |
| HCl (concentrated) | 1.5 |
| Monoalkyl ($C_{10}$–$C_{20}$, principally $C_{12}$–$C_{14}$) benzene monosulfonic acid sodium salt | 0.8 |
| Xylene | 100 |

The procedure followed was the same as that used in Example 1a, preceding. The phenol employed was a flaked solid. The solvent-free resin was dark red in color, hard, brittle, with a melting point of 128–140° C. It was xylene-soluble.

EXAMPLE 4a

The phenol employed (164 grams) was para-secondary amylphenol, which is a liquid. The procedure followed was the same as that used in Example 1a, preceding. The solvent-free resin was hard and brittle, reddish-black in color and with a melting point of 80–85° C.

EXAMPLE 5a

The phenol employed (164 grams) was a commercially available mixed amylphenol containing approximately 95 parts of para-tertiary amylphenol, and 5 parts of ortho-tertiary amylphenol. It was in the form of a fused solid. The procedure employed was the same as that used in Example 1a, preceding. The appearance of the resin was substantially the same as that of the product of Example 3a.

Sometimes resins produced from para-tertiary amylphenol and formaldehyde in the presence of an acid catalyst show a slight insolubility in xylene; that is, while completely soluble in hot xylene to give a clear solution they give a turbid solution in cold xylene. Such turbidity or lack of solubility disappears on heating, or on the addition of diethylethyleneglycol.

We have never noticed this characteristic property when using the commercial phenol of Example 5a which, as stated, is a mixture containing 95% para-tertiary amylphenol and 5% ortho-tertiary amylphenol. In fact, the addition of 5% to 8% of an ortho-substituted phenol, such as ortho-tertiary amylphenol to any difunctional phenol, such as the conventional para-substituted phenols herein mentioned, usually gives an increase in solubility when the resulting resin is high melting, which is often the case when formaldehyde and an acid catalyst are employed.

EXAMPLE 6a

The phenol employed (164 grams) was ortho-tertiary amylphenol which is a liquid. The procedure followed was the same as that used in Example 1a, and the appearance of the resin was light amber in color and transparent. It was soft to pliable in consistency and xylene-soluble.

EXAMPLE 7a

The phenol employed (178 grams) was para-tertiary hexylphenol. This is a solid at ordinary temperatures. The procedure followed was the same as that used in Example 1a preceding, and the appearance of the resin was substantially the same as that of the resin of Example 3a. The solvent-free resin is slightly opaque in appearance, reddish-amber in color, semi-hard to pliable in consistency, and xylene-soluble.

EXAMPLE 8a

The phenol employed was commercial para-octylphenol. 206 grams of this phenol were employed instead of 164 grams of an amylphenol or 150 grams of a butylphenol and 150 grams of xylene were used instead of 100. Otherwise, the procedure was the same as that used in Example 1a. The solvent-free resin obtained was reddish-amber in color, soft to pliable in consistency, and xylene-soluble.

EXAMPLE 9a

| | Grams |
|---|---|
| Para-phenylphenol | 170 |
| Formaldehyle, 37% | 81 |
| HCl (concentrated) | 1.5 |
| Monalkyl ($C_{10}$–$C_{20}$, principally $C_{12}$–$C_{14}$) benzene monosulfonic acid sodium salt | .8 |
| Xylene | 150 |
| Diethyleneglycol diethylether | 50 |

This phenol was solid. The phenol, xylene, diethyleneglycol diethylether, and hydrochloric acid were mixed together and heated to give complete solution at approximately 140° C. The use of diethyleneglycol diethylether, or some equivalent solvent, was necessary for the reason that this particular phenol is not sufficiently soluble in xylene. Having obtained a complete solution in the manner indicated, it was allowed to cool to approximately 75–80° C. and, thereafter, formaldehyde was added and the procedure was the same as that used in Example 1a.

When ortho-hydroxydiphenyl is substituted for para-hydroxydiphenyl one can eliminate the diethyleneglycol diethylether and use the procedure described in Example 1a, without modification. Ortho-substituted phenols yield resins which have lower melting points than do the para-substituted phenols and are usually more xylene-soluble than resins obtained from the corresponding para-substituted phenols. The matter of the lower melting point is also illustrated in the case of para-tertiary amylphenol resins in comparison with ortho-tertiary amylphenol resins. The resin obtained from ortho derivative and formaldehyde melts at about 80° C. and upward, whereas the comparable para derivative resin melts at about 160° C. In this instance, both resins are xylene-soluble.

EXAMPLE 10a

The same procedure was employed as in Example 1a, except that para-cyclohexylphenol, 176 grams, was employed along with 150 grams of xylene. This phenol was solid. The resulting resin minus solvents was opaque in appearance, xylene dispersible, amber in color, hard and brittle, with an approximate melting point of 170° C. It was sufficiently curable so as to prohibit distillation.

EXAMPLE 11a

The same procedure was employed as in Example 1a, preceding, using 198 grams of commercial styrylphenol and 150 grams of xylene. Styrylphenol is a white solid. The resin was reddish black in color, hard and brittle, with a melting point of about 80° to 85° C.

EXAMPLE 12a

| | Grams |
|---|---|
| Para-tertiary amylphenol (1.0 mole) | 164 |
| Formaldehyde 37% (0.8 mole) | 64.8 |
| Glyoxal 30% (0.1 mole) | 20.0 |
| Concentrated HCl | 2 |
| Monoalkyl ($C_{10}$–$C_{20}$, principally $C_{12}$–$C_{14}$) benzene monosulfonic acid sodium salt | .75 |
| Xylene | 150 |

This resin was prepared using the same equipment, and the same procedure as in Example 1a, preceding. The resin contained a slight amount of insoluble material which was removed by filtration of the xylene solution. This slight amount of insoluble material may have been the result of some very minor decomposition, due to the fact that the glyoxal was an aged sample. After removal of the small amount of insoluble material, the xylene was removed by distillation. The resultant resin was reddish amber in color, soft or liquid in consistency and xylene-soluble.

EXAMPLE 13a

| | Grams |
|---|---|
| Para-tertiary amylphenol (1.0 mole) | 164 |
| Glyoxal 30.2% (0.5 mole) | 96 |
| Concentrated HCl | 2 |
| Monoalkyl ($C_{10}$–$C_{20}$, principally $C_{12}$–$C_{14}$) benzene monosulfonic acid sodium salt | .8 |
| Xylene | 150 |

The same procedure was followed as in Example 1a. There was a modest precipitate of an insoluble material, approximately 15 grams, which had an insoluble sponge-like carbonaceous appearance. It was removed by filtration of the xylene solution as in Example 12a preceding. The resulting solvent-free resin was clear, reddish amber in color, soft to fluid in consistency, and xylene-soluble.

EXAMPLE 14a

| | Grams |
|---|---|
| Para-tertiary butylphenol (1.0 mole) | 150 |
| Acetaldehyde | 44 |
| Concentrated $H_2SO_4$ | 2 |
| Xylene | 100 |

The phenol, acid catalyst, and 50 grams of the xylene were combined in the resin pot previously described under Example 1a. The initial mixture did not include the aldehyde. The mixture was heated with stirring to approximately 150° C. and permitted to reflux.

The remainder of the xylene, 50 grams, was then mixed with the acetaldehyde; and this mixture was added slowly to the materials in the resin pot, with constant stirring, by means of the separatory funnel arrangement previously mentioned in the description of the resin pot in Example 1a. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour to an hour and a half before removing the water by means of the trap arrangement. After the water was removed the remainder of the procedure was essentially the same as in Example 1a. When a sample of the resin was freed from the solvent, it was dark red, semi-hard or pliable in consistency, and xylene-soluble.

EXAMPLE 15a

The same procedure was followed as in Example 14a, except that the para-tertiary butylphenol was replaced by an equal amount of para-secondary butylphenol. The appearance of the final resin on a solvent-free basis was substantially identical with the preceding example, except that it was somewhat more fluid in consistency and slightly tacky.

EXAMPLE 16a

The same procedure was followed as in Example 14a, except that the 150 grams of para-tertiary butylphenol were replaced by 164 grams of para-tertiary amylphenol. The final solvent-free resin was clear and dark red in color. It was xylene-soluble and semi-hard or pliable in consistency.

EXAMPLE 17a

The same procedure was followed as in Example 16a preceding except that the para-tertiary amylphenol was replaced by an equal amount of para-secondary amylphenol. The appearance of the resin was substantially identical with that of the resin of the preceding example, except that it was somewhat more fluid in consistency and slightly tacky.

EXAMPLE 18a

The same procedure was followed as in Example 16a except that the amylphenol employed was the phenol described in Example 5a. The appearance of the resin on a solvent-free basis was substantially the same as that of Example 16a.

EXAMPLE 19a

The same procedure was followed as in Example 16a except that the amylphenol employed was ortho-tertiary amylphenol. The resin on a solvent-free basis was transparent and reddish-black; it was soft to tacky in consistency and xylene-soluble.

EXAMPLE 20a

The same procedure was followed as in Example 14a, except that the 150 grams of para-tertiary butylphenol were replaced by 206 grams of commercial para-octylphenol. The solvent-free resin was dark red in color, soft to tacky in consistency, and xylene-soluble.

EXAMPLE 21a

The same procedure was employed as in Example 14a, except that the 150 grams of para-tertiary butylphenol were replaced by 170 grams of para-phenylphenol. The resin produced was at least dispersible in xylene when hot, giving the appearance of solubility. When the solution cooled, obvious separation took place. For this reason 100 grams of diethyleneglycol diethylether were added to the finished resin mixture, when hot, so as to give a suitable solution when cold.

A small sample was taken before adding the diethyleneglycol diethylether and the xylene evaporated in order to determine the character of the resin. The solvent-free resin was opaque and reddish-black in color. It was soft and pliable in consistency.

EXAMPLE 22a

The same procedure was followed as in Example 14a, except that 176 grams of para-cyclohexylphenol were employed instead of the para-tertiary butylphenol. The solvent-free resin was clear, dark red in appearance, soft to pliable in consistency, and xylene-soluble.

EXAMPLE 23a

The same procedure was followed as in Example 14a, except that the phenol employed was commercial styrylphenol and the amount employed was 198 grams. The resin was soft-to-pliable, reddish-black in color, and xylene-soluble.

EXAMPLE 24a

| | Grams |
|---|---|
| Para-tertiary amylphenol (1.0 mole) | 164 |
| Heptaldehyde (1.0 mole) | 114 |
| Concentrated $H_2SO_4$ | 2 |
| Xylene | 100 |

The procedure employed was essentially the same as in the Example 14a where acetaldehyde was employed, but with the difference that due to the fact that the particular aldehyde was a higher boiling aldehyde it was not necessary to dilute it with the xylene. For this reason all the xylene was added to the initial mixture, and the higher boiling aldehyde was added by means of the separatory funnel arrangement. Thus, the phenol, acid catalyst, and solvent were combined in a resin pot by the same procedure used as in Example 14a. The resin, after removal of the solvent by distillation, was clear, dark amber in color, had a soft, tacky appearance and was xylene-soluble.

EXAMPLE 25a

| | Grams |
|---|---|
| Para-secondary butylphenol (1.0 mole) | 150 |
| Heptaldehyde (1.0 mole) | 114 |
| Concentrated $H_2SO_4$ | 2 |
| Xylene | 100 |

The same procedure was employed as in Example 24a. The solvent-free resin had physical characteristics similar to those of the resin of Example 24a.

EXAMPLE 26a

| | Grams |
|---|---|
| Para-tertiary butylphenol (1.0 mole) | 150 |
| Heptaldehyde (1.0 mole) | 114 |
| Concentrated $H_2SO_4$ | 2 |
| Xylene | 100 |

This resin was prepared as in Example 24a preceding, with the resulting solvent-free resin being a clear, dark amber color, semi-hard or pliable, and xylene-soluble.

EXAMPLE 27a

| | Grams |
|---|---|
| Para-phenylphenol (1.0 mole) | 170 |
| Heptaldehyde (1.0 mole) | 114 |
| Concentrated $H_2SO_4$ | 2 |
| Xylene | 100 |

The resin was prepared as in Example 24a. The solvent-free resin was slightly opaque, dark amber in color, soft to fluid, and sufficiently xylene-dispersible to permit subsequent oxyalkylation.

EXAMPLE 28a

| | Grams |
|---|---|
| Para-cyclohexylphenol (3.0 moles) | 528 |
| Heptaldehyde (3.0 moles) | 342 |
| Concentrated $H_2SO_4$ | 6 |
| Xylene | 500 |

This resin, made as in Example 24a, in solvent-free form was clear, dark amber to black in color, semi-soft to pliable and xylene-soluble.

EXAMPLE 29a

| | Grams |
|---|---|
| Para-tertiary amylphenol (1.0 mole) | 164 |
| Benzaldehyde (1.0 mole) | 106 |
| Concentrated $H_2SO_4$ | 2 |
| Xylene | 100 |

This resin, made as in Example 24a, in solvent-free form was clear, dark red, hard, brittle, had a melting point of 160–165° C., and was xylene-soluble.

EXAMPLE 30a

| | Grams |
|---|---|
| Para-secondary butylphenol (1.0 mole) | 150 |
| Benzaldehyde (1.0 mole) | 106 |
| Concentrated $H_2SO_4$ | 2 |
| Xylene | 100 |

This resin, made following the procedure employed in Example 24a, in solvent-free form was clear, mahogany in color, semi-hard or pliable and xylene-soluble.

EXAMPLE 31a

| | Grams |
|---|---|
| Para-tertiary butylphenol (1.5 moles) | 225 |
| Benzaldehyde (1.5 moles) | 159 |
| Concentrated $H_2SO_4$ | 3 |
| Xylene | 200 |

The above reactants were combined by the procedure of Example 24a. The solvent-free resin was a clear, hard, brittle, reddish amber colored resin, which was xylene-soluble, and had a melting point of 180–185° C. It was to some degree heat curable.

EXAMPLE 32a

| | Grams |
|---|---|
| Para-phenylphenol (1.5 moles) | 255 |
| Benzaldehyde (1.5 moles) | 159 |
| Concentrated $H_2SO_4$ | 3 |
| Xylene | 200 |

This resin was made as in Example 24a. The resulting solvent-free resin was clear, dark red, hard, and brittle, with a melting point of 200–205° C. It was somewhat heat curable, and almost completely soluble in xylene, with some insoluble material which was dispersible.

EXAMPLE 33a

| | Grams |
|---|---|
| Para-cyclohexylphenol (3.0 moles) | 528 |
| Benzaldehyde (3.0 moles) | 318 |
| Concentrated $H_2SO_4$ | 6 |
| Xylene | 500 |

This resin, formed by combining the above reactants according to the procedure employed in Example 24a, was hard, brittle, xylene-soluble, reddish-black in color, and had a melting point of 165–170° C., with a tendency towards being heat curable.

EXAMPLE 34a

| | Grams |
|---|---|
| Para-tertiary amylphenol (1.0 mole) | 164 |
| Propionaldehyde 96% (1.0 mole) | 60.5 |
| Concentrated $H_2SO_4$ | 2 |
| Xylene | 150 |

The above reactants were combined according to the procedure followed in Example 24a. The resulting solvent-free resin was clear, dark amber in color, soft to pliable, and xylene-soluble.

EXAMPLE 35a

| | Grams |
|---|---|
| Para-secondary butylphenol | 150 |
| Propionaldehyde 96% | 60.5 |
| Concentrated $H_2SO_4$ | 2 |
| Xylene | 100 |

This resin was prepared according to the procedure employed in Example 24a. The resulting solvent-free resin was clear, soft to fluid, dark amber in color, and was xylene-soluble.

EXAMPLE 36a

| | Grams |
|---|---|
| Para-tertiary butylphenol (1.0 mole) | 150 |
| Propionaldehyde 96% (1.0 mole) | 60.6 |
| Concentrated $H_2SO_4$ | 2 |
| Xylene | 100 |

This resin was prepared according to the procedure employed in Example 24a. The resulting solvent-free resin was clear, dark amber in color, xylene-soluble, hard and brittle, and has a melting point of 80–85° C.

EXAMPLE 37a

| | Grams |
|---|---|
| Para-phenylphenol (3.0 moles) | 510 |
| Propionaldehyde, 96% (3.0 moles) | 182 |
| Concentrated $H_2SO_4$ | 6 |
| Xylene | 500 |

The resulting resin, prepared according to the procedure of Example 24a, when solvent-free, was opaque, hard, black, and xylene-insoluble, but somewhat dispersible in xylene. Addition of a minor proportion of ethyleneglycol diethylether completely solubilized the resin in xylene, a clear solution resulting.

EXAMPLE 38a

| | Grams |
|---|---|
| Para-cyclohexylphenol (3.0 moles) | 528 |
| Propionaldehyde 96% (3.0 moles) | 182 |
| Concentrated $H_2SO_4$ | 6 |
| Xylene | 500 |

The resulting resin, prepared according to directions in Example 24a, when solvent-free was clear, dark amber in color, xylene-soluble, hard and brittle, and had a melting point of 84–90° C.

EXAMPLE 39a

| | Grams |
|---|---|
| Para-tertiary amylphenol | 164 |
| 2-ethyl-3-propyl acrolein | 126 |
| Concentrated $H_2SO_4$ | 2 |
| Xylene | 100 |

The procedure employed was the same as for the use of heptaldehyde, as in Example 24a. The resulting solvent-free resin was dark amber to black in color, and soft to fluid in consistency. It was xylene-soluble.

EXAMPLE 40a

| | Grams |
|---|---|
| Para-tertiary butylphenol | 150 |
| 2-ethyl-3-propyl acrolein | 126 |
| Concentrated $H_2SO_4$ | 2 |
| Xylene | 100 |

The procedure employed was the same as for the use of heptaldehyde, as in Example 24a. The appearance of the resin was the same as the resin of the Example 39a.

EXAMPLE 41a

| | Grams |
|---|---|
| Commercial para-octylphenol | 206 |
| 2-ethyl-3-propyl acrolein | 126 |
| Concentrated $H_2SO_4$ | 2 |
| Xylene | 100 |

The procedure employed was the same as for the use of heptaldehyde, as in Example 24a. The appearance of the resin was the same as the resin of Example 39a.

EXAMPLE 42a

| | Grams |
|---|---|
| Para-tertiary amylphenol | 164 |
| Furfural | 96 |
| Potassium carbonate | 8 |

The furfural was shaken with dry sodium carbonate prior to use, to eliminate any acids, etc. The procedure employed was substantially that described in detail in Technical Bulletin No. 109 of the Quaker Oats Company, Chicago, Illinois. The above reactants were heated under the reflux condenser for two hours in the same resin pot arrangement described in Example 1a. The separatory funnel device was not employed. No xylene or other solvent was added. The amount of material vaporized and condensed was comparatively small except for the water of reaction. At the end of this heating or reflux period, the trap was set to remove the water. The maximum temperature during and after removal of water was approximately 202° C. The material in the trap represented 16 cc. water and 1.5 cc. furfural. The resin was a bright black, hard resin, xylene-soluble, and had a melting point of 130° to 135° C., with some tendency towards being slowly curable. We have also successfully followed this same procedure using 3.2 grams of potassium carbonate instead of 8.0 grams.

EXAMPLE 43a

| | Grams |
|---|---|
| Para-tertiary amylphenol | 164 |
| Furfural (carbonate treated) | 70 |
| Potassium carbonate | 3.2 |

The procedure employed was the same as that of Example 42a. The amount of water distilled was 10 cc. and the amount of furfural, 3 cc. The resin was a bright black, xylene-soluble resin, semi-pliable to hard.

EXAMPLE 44a

| | Grams |
|---|---|
| Para-tertiary amylphenol | 492 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2.0 |
| Xylene | 200 |

The above reactants were combined in a resin pot similar to that previously described, equipped with stirrer and reflux condenser. The reactants were heated with stirring under reflux for 2 hours at 100° to 110° C. The resinous mixture was then permitted to cool sufficiently to permit the addition of 15 ml. of glacial acetic acid in 150 cc. $H_2O$. On standing, a separation was effected, and the aqueous lower layer drawn off. The upper resinous solution was then washed with 300 ml. of water to remove any excess HCHO, sodium acetate, or acetic acid. The xylene was then removed from the resinous solution by distilling under vacuum to 150° C. The resulting resin was clear, light amber in color, and semi-fluid or tacky in consistency.

EXAMPLE 45a

| | Grams |
|---|---|
| Para-secondary butylphenol | 450 |
| Formaldehyde 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2 |
| Xylene | 200 |

The same procedure was followed as in Example 44a. The resulting solvent-free resin was clear, light amber in color, and semi-fluid or tacky in consistency.

EXAMPLE 46a

| | Grams |
|---|---|
| Para-phenylphenol | 510 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2.0 |
| Xylene | 500 |

The same procedure was employed as in Example 44a, except that the reaction product contained a considerable amount of a white crystalline solid which was alcohol-soluble and xylene-insoluble, necessitating the use of some isopropyl alcohol in effecting a separation. The resulting solvent-free resin had a grayish-white crystalline structure, and was hard, brittle, non-xylene-soluble but soluble in an xylene-diethyleneglycol diethylether mixture. This crystalline structure in phenylphenol resins has been noted in the literature.

EXAMPLE 47a

| | Grams |
|---|---|
| Para-cyclohexylphenol | 528 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2.0 |
| Xylene | 300 |

This resin was made and worked up in the same manner as in Example 46a. The resin, after distillation and standing overnight, developed the same type of crystalline structure noted in the resin of the Example 46a. However, on cooling immediately after distillation, the resulting product was clear, light amber in color, and fairly soft in consistency.

EXAMPLE 48a

| | Grams |
|---|---|
| Para-tertiary butylphenol | 450 |
| Formaldehyde, 30% | 652 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2 |
| Xylene | 300 |

The same procedure was followed as in Example 44a. The resulting resin was deep red in color, clear, and soft or semi-fluid in consistency.

EXAMPLE 49a

This resin was prepared as in Example 44a except that the paratertiary amylphenol-formaldehyde ratio was 1 to 1.1 moles. The resulting solvent-free resin was dark red in color, clear and semi-hard or pliable in consistency.

EXAMPLE 50a

The resin was prepared as in Example 48a except that the paratertiary butylphenol-formaldehyde ratio was 1 to 1.1 moles. The resulting solvent-free resin was dark red in color, clear, hard, brittle, and had a melting point of 100–105° C.

EXAMPLE 51a

| | | |
|---|---|---|
| Commercial para-octyl phenol | grams | 412 |
| Formaldehyde, 30% | do | 220 |
| NaOH in 20 cc. $H_2O$ | do | 4.5 |
| Monoalkyl ($C_{10}$–$C_{20}$, principally $C_{12}$–$C_{14}$) benzene monosulfonic acid sodium salt | do | 1.5 |
| Xylene | do | 300 |
| Glacial acetic acid | cc | 10 |

This resin was prepared as in Example 44a. A small amount, approximately 1%, of an insoluble, infusible flocculent precipitate was noted dispersed throughout the resinous solution. This was filtered out before distillation. The resin, after vacuum distillation to 150° C. to remove the solvent, was dark red in color, clear, hard and brittle, with a melting point of 113–117° C.

EXAMPLE 52a

Resin of Example 44a was subjected to vacuum distillation to 225° C., at 25 mm. Hg. The resulting product was a hard, brittle resin, xylene-soluble, and having a melting point of 145–150° C.

EXAMPLE 53a

Resin of Example 45a was subjected to vacuum distillation to 225° C., at 25 mm. Hg. The resulting product was hard, brittle, black in color, xylene-insoluble, and infusible up to 220° C. However, if the vacuum distillation was taken to only 175 or 180° C., at 25 mm. Hg the resulting product was xylene-soluble and had a melting point of approximately 170° C.

EXAMPLE 54a

Resin of Example 46a was subjected to vacuum distillation to 225° C., at 25 mm. Hg. The resulting product was opaque or crystalline, xylene-dispersible, and soluble in a mixed solvent of 75% xylene and 25% diethyleneglycol diethylether, with a melting point of 100–105° C.

EXAMPLE 55a

Resin of Example 47a was subjected to vacuum distillation to 225° C., at 25 mm. Hg. The resulting product was opaque or crystalline, dark brown in color, xylene-soluble, and semi-hard or pliable in consistency.

EXAMPLE 56a

Resin of Example 48a was subjected to vacuum distillation to 225° C., at 25 mm. Hg. The resulting product was hard, brittle, partially xylene-insoluble, but soluble in a mixed solvent of 75% xylene and 25% diethyleneglycol diethylether with an approximate melting point of 160–165° C. It was also heat curable.

EXAMPLE 57a

Resin of Example 49a was subjected to vacuum distillation to 225° C. at 25 mm. Hg. The resulting product was dark amber to black in color, xylene-soluble, hard and brittle, with a melting point of 145–150° C.

EXAMPLE 58a

Resin of Example 50a was subjected to vacuum distillation to 225° C., at 25 mm. Hg. The resulting resin was black in color, hard and brittle, xylene-dispersible, and soluble in a mixed solvent of 75% xylene and 25% diethyleneglycol diethylether, with a melting point of 165–170° C. It was also heat curable.

EXAMPLE 59a

Resin of Example 51a was subject to vacuum distillation to 225° C., at 25 mm. Hg. The resulting resin was dark ambler in color, xylene-soluble, hard and brittle, with a melting point of 115–120° C.

EXAMPLE 60a

| | Grams |
|---|---|
| Commercial para-tertiary amylphenol (described in Example 5a) | 328 |
| Formaldehyde, 37% | 352 |
| NaOH in 20 cc. $H_2O$ | 4.5 |
| Monoalkyl ($C_{10}$–$C_{20}$, principally $C_{12}$–$C_{14}$) benzene monosulfonic acid sodium salt | 1.5 |

The above reactants were refluxed with stirring for 2 hours. 200 grams of xylene were then added and the whole cooled to 90–100° C., and the NaOH neutralized with 10 cc. glacial acetic acid in 100 cc. $H_2O$. The mass was allowed to stand, effecting a separation. The lower aqueous layer was withdrawn and the upper resinous solution was washed with water. After drawing off the wash water, the xylene solution was subjected to vacuum distillation, heating to 150° C. The resulting solvent-free resin was xylene-soluble, soft or tacky in consistency, and pale yellow or light amber in color.

On heating further, without vacuum distillation, the following physical changes were noted:

Heated to 160° C.—Soft, tacky, pale yellow
Heated to 190° C.—Hard, fairly brittle, pale yellow—low melting point
Heated to 200° C.—Hard, fairly brittle, pale yellow—105–115° C. melting point
Heated to 225° C.—Hard, brittle, amber—120–125° C. melting point
Heated to 250° C.—Hard, brittle, dark amber—128–135° C. melting point
Heated to 275° C.—Very brittle, deep brown—155–160° C. melting point The above distillation was without the use of vacuum. It illustrates that heating alone, or heating with vacuum, changes a lowstage resin into a medium or high-stage resin.

EXAMPLE 61a

This resin was obtained by the vacuum distillation of resin of Example 3a. Vacuum distillation was conducted up to 250° C. at 25 mm. Hg. The resulting resin was hard, brittle, amber colored, and had a slightly higher melting point than the resin prior to vacuum distillation, to wit, 140–145° C. It was xylene-soluble. The molecular weight, determined cryoscopically using benzene, was approximately 1400.

EXAMPLE 62a

This resin was obtained by the vacuum distillation of resin of Example 8a. Vacuum distillation was conducted up to 225° C. at 25 mm. Hg. The resulting resin was xylene-soluble, hard, brittle, reddish black in color, with a melting point of 140–145° C. Note that this resin, prior to vacuum distillation, was soft to pliable in consistency.

EXAMPLE 63a

This resin was obtained by the vacuum distillation of resin of Example 10a. Vacuum distillation was conducted up to 225° C. at 25 mm. Hg. The resulting resin was xylene-dispersible, soluble in a mixture of xylene and diethyleneglycol diethylether, dark brown in color, and hard and brittle in nature. It had a melting point of 180–185° C. This was moderately higher than the resin prior to vacuum distillation.

EXAMPLE 64a

This resin was obtained by the vacuum distillation of resin of Example 9a. Vacuum distillation was conducted up to 225° C. at 25 mm. Hg. The resulting resin was semi-hard but still contained some diethyleneglycol diethylether. Unquestionably, if completely separated from this solvent it would have been a hard solid resin. Such residual solvent was not eliminated lest there be danger of pyrolysis.

EXAMPLE 65a

This resin was obtained by the vacuum distillation of resin of Example 16a. Vacuum distillation was conducted up to 225° C. at 25 mm. Hg. The resulting resin had the same physical characteristics as the undistilled resin except that it was slightly more viscous.

EXAMPLE 66a

This resin was obtained by the vacuum distillation of resin of Example 15a. Vacuum distillation was conducted up to 225° C. at 25 mm. Hg. The resulting resin was semi-hard to pliable.

EXAMPLE 67a

This resin was obtained by the vacuum distillation of resin of Example 20a. Vacuum distillation was conducted up to 225° C. at 25 mm. Hg. The resulting resin was hard to pliable.

In the immediately preceding examples describing the production of resins by the vacuum distillation of resins of earlier examples, the vacuum used was approximately 25 mm. and the temperature was brought up to 225° C. Generally speaking, this is about the maximum temperature which is usable, and if the products obtained on distilling to this temperature, even if xylene-soluble, give insoluble or rubbery products on oxyethylation, the temperature used should be lower. We have found that using a temperature of 190° C. at 25 mm. gives very satisfactory compounds.

EXAMPLE 68a

| | Grams |
|---|---|
| Commercial para-tertiary amylphenol (described in Example 5a) | 164 |
| Formaldehyde, 37% | 81 |
| Monoalkyl ($C_{10}$–$C_{20}$, principally $C_{12}$–$C_{14}$) benzene monosulfonic acid sodium salt | .8 |
| Xylene | 200 |

No catalyst was added in this example. The reactants were placed in an autoclave and stirred while heating to a temperature of approximately 160° C. The total period of reaction was 5½ hrs. During the early part of this period the temperature was 156° C. with a gauge pressure of 110 pounds. During the last part of the period, probably due to the absorption of formaldehyde, the pressure dropped to 75 pounds gauge pressure while the temperature held at about 150° C. After this 5½ hour reaction period the autoclave was allowed to cool. The liquids were withdrawn and the xylene solution of the resin was decanted away from the small aqueous layer. The xylene solution, containing a bit of the aqueous layer carried over mechanically, was subjected to vacuum distillation up to 150° C. at 25 mm. Hg.

The resulting resin was fairly hard and brittle, xylene-soluble, dark, amber in color, with a melting point of 55° to 66° C., and a molecular weight of 490. If desired, one may use considerably higher pressure so as to speed up the reaction and also in order to obtain resins of higher molecular weight. We have employed the same procedure with moderately higher temperatures and definitely higher pressures.

As far as the manufacture of resins is concerned, it is usually most convenient to employ a catalyst such as illustrated by previous examples.

Previous reference has been made to the use of a single phenol, as herein specified, or a single reactive aldehyde. Obviously, mixtures of reactants may be employed, as, for example, a mixture of para-butylphenol and para-amylphenol, or a mixture of para-butylphenol and para-hexylphenol, or para-butylphenol and para-phenylphenol. It is extremely difficult to depict the structure of a resin derived from a single phenol. When mixtures of phenols are used, even in equimolar proportions, the structure of the resin is even more indeterminable. In other words, a mixture involving para-butylphenol and para-amylphenol might have an alternation of the two nuclei, or one might have a series of butylated nuclei and then a series of amylated nuclei. If a mixture of aldehydes is employed, for instance, acetaldehyde and butyraldehyde, or acetaldehyde and formaldehyde, or benzaldehyde and acetaldehyde, the final structure of the resin becomes even more complicated and possibly depends upon the relative reactivity of the aldehydes.

If organic solvent-soluble, fusible, phenol resins, particularly phenol-aldehyde resins of the kind exemplified by previous examples, are subjected to further treatment or after-treatment with acetylene or an acetylene polymer or homologue, one obtains a new or different type of resin, in which at least part of the resin is characterized by a structure in which at least two or more of the phenolic nuclei are joined to different carbon atoms instead of the same carbon atom, as is conventional structure in usual phenol-aldehyde resins.

The after-treatment is conducted simply in the presence of a catalyst, as in the preparation of the original resin, as exemplified by previous examples, particularly Examples 11 and 12. The amount of acetylene or acetylenic reactant added can be considerably less, for instance, 5 to 10 parts of acetylene can be conveniently employed instead of 14 to 20 parts of acetylene, based on 100 parts of the original resin. Such procedure is illustrated by the following examples:

EXAMPLE 1b 100 parts of a resin obtained from para-tertiary butyl-phenol and formaldehyde in the manner described under the heading of Example 1a, and 10 parts of zinc acetate were treated with acetylene at 210° C. in a shaking autoclave, or preferably in an autoclave equipped with a stirring device, such as an autoclave designated as the Stirring-type Superpressure Autoclave and manufactured by the American Instrument Co., Silver Spring, Maryland. The absorption of acetylene was slow with a shaking autoclave, but rapid with a stirring autoclave. 5 to 10 parts of acetylene can generally be absorbed in 1½ to 8 hours, and the temperature may vary ten to twenty-five degrees in either direction. The final product was a clear resin, the color being about the same as the original resin used as a raw material, soluble in xylene, and it was readily susceptible to oxyalkylation in the manner described in the subsequent text.

EXAMPLE 2b

The same procedure was followed as in the example immediately preceding, except that the resin employed was the one described under the heading of Example 2a, instead of Example 1a.

EXAMPLE 3b

The same procedure was followed as in the example immediately preceding, except that the resin employed was the one described under the heading of Example 3a, instead of Example 1a.

EXAMPLE 4b

The same procedure was followed as in the example immediately preceding, except that the resin employed was the one described under the heading of Example 4a instead of Example 1a.

EXAMPLE 5b

The same procedure was followed as in the example immediately preceding, except that the resin employed was the one described under the heading of Example 5a instead of Example 1a.

EXAMPLE 6b

The same procedure was followed as in the example immediately preceding, except that the resin employed was the one described under the heading of Example 8a, instead of Example 1a.

EXAMPLE 7b

The same procedure was followed as in the example immediately preceding, except that the resin employed was the one described under the heading of Example 14a, instead of Example 1a.

EXAMPLE 8b

The same procedure was followed as in Example 1b, preceding, except that the resin employed was the one derived from para-nonyl-phenol and formaldehyde.

EXAMPLE 9b

The same procedure was followed as in Example 1b, preceding, except that the resin employed was the one derived from menthylphenol and formaldehyde.

EXAMPLE 10b

The same procedure was followed as in Example 1b, preceding, except that the resin employed was the one derived from decylphenol and formaldehyde.

We have obtained some outstanding examples of surface-active materials, particularly for use as demulsifiers in the treatment of water-in-oil emulsions, by subjecting a conventional phenol-acetylene resin such as Koresin derived from para-tertiary butyl phenol, as previously described (to an after-treatment with an aldehyde, particularly formaldehyde, and then subsequently subjecting such resin to oxyalkylation, particularly oxyethylation. The following examples illustrate the preparation of such resins.

EXAMPLE 1c

| | Grams |
|---|---|
| Koresin (butyl) | 201 |
| Formaldehyde 37% | 24 |
| Concentrated HCl | 1.5 |
| Monoalkyl ($C_{10}$–$C_{20}$, principally $C_{12}$–$C_{14}$) benzene mono-sulfonic acid sodium salt | .8 |
| Xylene | 150 |

This double-treated resin was prepared following the directions under Example 1a, preceding. The resin, prior to after-treatment, had a melting point or softening point in the neighborhood of 120° to 130° C. The final resin, when solvent was removed, was hard, brittle, clear and amber-colored. On standing, it became opaque. The melting point was considerably higher than in the initial resin, approximately 180° C. In subjecting this type of resin to treatment with an alkylene oxide, such as ethylene oxide, the treatment was conventional in the sense that it was the same as employed with organic solvent-soluble, phenol-aldehyde resins, or phenol-acetylene resins, or mixtures of the two, if one wanted to employ such. In such after-treatment it is not unusual to find a small amount of hard, insoluble material which can be removed by merely filtering the xylene solution. The amount of such insoluble material is comparatively small, usually just a few percent of the total, or sometimes as much as 5%.

EXAMPLE 2c

The same procedure was followed as in Example 1c, preceding, except that the initial resin employed, instead of being a butylphenol-acetylene resin was a para-tertiary amylphenol acetylene resin.

EXAMPLE 3c

The same procedure was followed as in Example 1c, preceding, except that the initial resin employed was a para-octyl-phenol-acetylene resin.

EXAMPLE 4c

The same procedure was followed as in Example 1c, preceding, except that the initial resin employed was a para-nonyl-phenol-acetylene resin.

EXAMPLE 5c

The same procedure was followed as in Example 1c, preceding, except that the initial resin employed was a para-menthyl-phenol-acetylene resin.

With reference to the previous resins, it is obvious that one might use a mechanical mixture of two different resins, or one might use a variety of phenolic reactants or a variety of aldehydes. Similarly, one might use more than one oxyalkylating agent in the subsequent step of oxyalkylation, for instance, ethylene oxide and propylene oxide. It is understood, of course, that the use of oxyalkylated derivatives of such acetylenic resins derived from a plurality of reactants, instead of being limited to a single reactant from each of the various classes, are herein contemplated and specifically included, for the reason that they are obvious variants and nothing more.

PART 3

Having obtained a suitable resin of the kind described, such resin is subjected to treatment with a low molal reactive alpha-beta olefine oxide so as to render the product distinctly hydrophile in nature, as indicated by the fact that it becomes self-emulsifiable or miscible or soluble in water, or self-dispersible, or has emulsifying properties. The olefine oxides employed are characterized by the fact that they contain not over 4 carbon atoms and are selected from the class consisting of ethylene oxide, propylene oxide, butylene oxide, glycide, and methylglycide. Glycide may be, of course, considered as a hydroxypropylene oxide and methyl glycide as a hydroxy butylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide, the oxygen-carbon ratio is 1:2. In glycide, it is 2:3; and in methyl glycide, 1:2. In such compounds, the ratio is very favorable to the production of hydrophile or surface-active properties. However, the ratio, in propylene oxide, is 1:3, and in butylene oxide, 1:4. Obviously, such latter two reactants are satisfactorily employed only where the resin composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued using the more favorable members of the class, to produce the desired hydrophile product. Used alone, these two reagents may in some cases fail to produce sufficiently hydrophile derivatives because of their relatively low oxygen-carbon ratios.

Thus, ethylene oxide is much more effective than propylene oxide, and propylene oxide is more effective than butylene oxide. Hydroxy propylene oxide (glycide) is more effective than propylene oxide. Similarly, hydroxy butylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a nonvolatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation in presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure, that is, the combined pressure due to xylene and also due to ethylene oxide or whatever other oxyalkylating agent is used. Under such circumstances it may be necessary at times to use substantial pressures to obtain effective results, for instance, pressures up to 300 pounds along with correspondingly high temperatures, if required.

However, even in the instance of high-melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Another suitable procedure is to use propylene oxide or butylene oxide as a solvent as well as a reactant in the earlier stages along with ethylene oxide, for instance, by dissolving the powdered resin in propylene oxide even though oxyalkylation is taking place to a greater or lesser degree. After a solution has been obtained which represents the original resin dissolved in propylene oxide or butylene oxide, or a mixture which includes the oxyalkylated product, ethylene oxide is added to react with the liquid mass until hydrophile properties are obtained. Since ethylene oxide is more reactive than propylene oxide or butylene oxide, the final product may contain some unreacted propylene oxide or butylene oxide which can be eliminated by volatilization or distillation in any suitable manner.

Attention is directed to the fact that the resins herein described must be fusible or soluble in an organic solvent. Fusible resins invariably are soluble in one or more organic solvents such as those mentioned elsewhere herein. It is to be emphasized, however, that the organic solvent employed to indicate or assure that the resin meets this requirement need not be the one used in oxyalkylation. Indeed solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance to 100 to 200 mesh, and a slurry or suspension prepared in xylene or the like, and subjected to oxyalkylation. The fact that the resin is soluble in an organic solvent or the fact that it is fusible means that it consists of separate molecules. The resins of the type herein specified possess reactive hydroxyl groups and are oxyalkylation susceptible.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools.

Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension again paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50–50 solution is then mixed with 1–3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain. It is well known that the size and nature or structure of the resin polymer obtained varies somewhat with the conditions of reaction, the proportions of reactants, the nature of the catalyst, etc.

In our co-pending application Serial No. 8,730, filed February 16, 1948, in regard to phenol-aldehyde resin per se, we said as follows:

"Based on molecular weight determinations, most of the resins prepared as herein described, particularly in the absence of a secondary heating step, contain 3 to 6 or 7 phenolic nuclei with approximately 4½ or 5½ nuclei as an average. More drastic conditions of resinification yield resins of greater chain length. Such more intensive resinification is a conventional procedure and may be employed if desired. Molecular weight, of course, is measured by any suitable procedure, particularly by cryoscopic methods; but using the same reactants and using more drastic conditions or resinification one usually finds that higher molecular weights are indicated by higher melting points of the resins and a tendency to decreased solubility. See what has been said elsewhere herein in regard to a secondary step involving the heating of a resin with or without the use of vacuum."

If such resins are given an after-treatment with acetylene, and such treatment, in order to meet the requisites herein stated, joins at least two resin molecules together by a linkage such as the following:

$$\begin{array}{c} \text{H} \ \ \text{H} \\ -\text{C}-\text{C}- \\ \text{H} \ \ \text{H} \end{array}$$

then, of course, there is an increase in molecular weight of at least double the previous value. Similarly, resins prepared in the manner of the commercial product, Koresin, or an amyl, hexyl, or octyl Koresin is prepared, may yield relatively soft or tacky resins in which there are only 3 or 4 or possibly 5 units. Such resins can be treated further with formaldehyde in the manner described so as to give resins of higher molecular weights than the initial resin. Therefore, without attempting to elaborate too closely, we simply desire to point out that the range of molecular weight of the various resins herein contemplated may go anywhere from a low range resin having 3 to 6 or 7 phenolic nuclei with approximately 4 to 5 nuclei as an average, up to ratios double these values or in excess thereof.

In some cases, however, the situation in the instant case is complicated by the fact that there may be two resinification procedures, one involving an aldehyde and the other involving acetylene. In other words, a phenol-aldehyde resin may be subjected to treatment with acetylene, or inversely, a phenol-acetylene resin may be treated with an aldehyde. The most practical procedure is simply to take any mixture of phenols and treat it with acetylene or the equivalent, to obtain a fusible, organic solvent-soluble resin; or if desired, prepare a phenol-aldehyde resin and prepare such resin with acetylene.

As far as the preparation of the phenol-aldehyde resins go for subsequent after-treatment with acetylene, attention is called to the following paragraph which appears in our aforementioned co-pending application, Serial No. 8,730:

"We have pointed out that either an alkaline or acid catalyst is advantageously used in preparing the resin. A combination of catalysts is sometimes used in two stages; for instance, an alkaline catalyst is sometimes employed in a first stage, followed by neutralization and addition of a small amount of acid catalyst in a second stage. It is generally believed that even in the presence of an alkaline catalyst, the number of moles of aldehyde, such as formaldehyde, must be greater than the moles of phenol employed in order to introduce methylol groups in the intermediate stage. There is no indication that such groups appear in the final resin, if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20, and, as far as we have been able to determine, such resins are free from methylol groups. As a matter of fact, it is probable that in acid-catalyzed resinifications, the methylol structure may appear only momentarily at the very beginning of the reaction, and in all probability, is converted at once into a more complex structure during the intermediate stage."

One procedure which can be employed in the use of a new resin to prepare products for use in the process of the invention, is to determine the hydroxyl value by the Verley-Bölsing method or its equivalent. The resin, as such, or in the form of a solution, as described, is then treated with ethylene oxide in presence of 0.5% to 2% of sodium methylate as a catalyst in step-wise fashion. The conditions of reaction, as far as time or percent is concerned, are within the range previously indicated. With suitable agitation, the ethylene oxide, if added in molecular proportion, combines within a comparatively short time, for instance, a few minutes to 2 to 6 hours, but in some instances, requires as much as 8 to 24 hours. A useful temperature range is from 125° to 225° C. The completion of the reaction of each addition of ethylene oxide in step-wise fashion is usually indicated by the reduction or elimination of pressure. An amount conveniently used for each addition is generally equivalent to a mole or two moles of ethylene oxide per hydroxyl radical. When the amount of ethylene oxide added is equivalent to approximately 50%, by weight, of the original resin, a sample is tested for incipient hydrophile properties, by simply shaking up in water as is, or after the elimination of the solvent if a solvent is present. The amount of ethylene oxide used to obtain a useful demulsifying agent, as a rule, varies from 70%, by weight, of the original resin, to as much as five or six times the weight of the original resin. With propylene oxide, even a greater molecular proportion is required, and sometimes a resultant of only limited hydrophile properties is obtainable. The same is true to even a greater extent with butylene oxide. The hydroxylated alkaylene oxides are more effective in solubilizing properties than the comparable compounds in which no hydroxyl is present.

Attention is directed to the fact that in the subsequent examples reference is made to the step-wise addition of the alkylene oxide, such as ethylene oxide. It is understood, of course, that there is no objection to the continuous addition of alkylene oxide untitl the desired stage of reaction is reached. In fact, there may be less of a hazard involved, and it is often advantageous to add the alkylene oxide slowly in a continuous stream and in such amount as to avoid exceeding the higher pressures noted in the various examples or elsewhere.

It may be well to emphasize the fact that when resins are produced from difunctional phenols and some of the higher aliphatic aldehydes, such as acetaldehyde, the resultant is a comparatively soft or pitch-like resin at ordinary temperatures. Such pitch-like resins can be treated with acetylene in the manner previously described to give products suitable for oxyalkylation. Such acetylene-treated resins become comparatively fluid at 110° to 165° C., as a rule and thus can be readily oxyalkylated, preferably oxyethylated, without the use of a solvent.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface-activity, show unusual properties, as the hydrophile character varies from a minimum to an ultimate maximum. One should not underestimate the utility of any of these products in a surface-active or sub-surface-active range without testing them for demulsification. A few simple laboratory tests which can be conducted in a routine manner will usually give all the information that is required.

For instance, a simple rule to follow is to prepare a resin having at least three phenolic nuclei and being organic solvent-soluble. Oxyethylate such resin, using the following four ratios of moles of ethylene oxide per phenolic unit equivalent: 2 to 1; 6 to 1; 10 to 1; and 15 to 1. From a sample of each product, remove any solvent that may be present, such as xylene. Prepare 0.5% and 5.0% solutions in distilled water, as previously indicated. A mere examination of such series will generally reveal an approximate range of minimum hydrophile character, moderate hydrophile character, and maximum hydrophile character. If the 2 to 1 ratio does not show minimum hydrophile character by test of the solvent-free product, then one should test its capacity to form an emulsion when admixed with xylene or other insoluble solvent. If neither test shows the required minimum hydrophile property, repetition using 2½ to 4 moles per phenolic nucleus will serve. Moderate hydrophile character should be shown by either the 6 to 1 or 10 to 1 ratio. Such moderate hydrophile character is indicated by the fact that the sol in distilled water within the previously mentioned concentration range is a permanent translucent sol, when viewed in a comparatively thin layer, for instance, the depth of a test tube. The ultimate hydrophile character is usually shown at the 15 to 1 ratio test, in that adding a small amount of an insoluble solvent, for instance, 5% of xylene, yields a product which will give, at least temporarily, a transparent or translucent sol of the kind just described. The formation of a permanent foam, when a 0.5% to 5.0% aqueous solution is shaken, is an excellent test for surface-activity. Previous reference has been made to the fact that other oxyalkylating agents may require the use of increased amounts of alkylene oxide. However, if one does not even care to go to the trouble of calculating molecular weights, one can simply arbitrarily prepare compounds containing ethylene oxide, equivalent to about 50% to 75%, by weight, for example, 65%, by weight, of the resin to be oxyethylated; a second example using approximately 200% to 300%, by weight, and a third example using about 500% to 750%, by weight, to explore the range of hydrophile-hydrophobe balance.

A practical examination of the factor of oxyalkylation level can be made by a very simple test, using a pilot plant autoclave having a capacity of about 10 to 15 gallons, as hereinafter described. Such laboratory-prepared routine compounds can then be tested for solubility, and, generally speaking, this is all that is required to give a suitable variety covering the hydrophile-hydrophobe range. All these tests, as stated, are intended to be routine tests and nothing more. They are intended to teach a person, even though unskilled in oxyethylation or oxyalkylation, how to prepare in a perfectly arbitrary manner, a series of compounds illustrating the hydrophile-hydrophobe range.

If one purchases a thermoplastic or fusible resin on the open market selected from a suitable number which are available, one might have to make certain determinations in order to make the quickest approach to the appropriate oxyalkylation range. For instance, one should know (a) The molecular size, indicating the number of phenolic units;

(b) The nature of the acetylenic bridge, which is usually C₂H₄, or an aldehydic bridge, if present, as in the case of a mixed resin, as previously described; and (c) The nature of the substituent, which is usually butyl, hexyl, decyl, nonyl or menthyl.

With such information, one is in substantially the same position as if one had personally made the resin prior to oxyethylation.

Some sort of estimate which would be approximate only but still suitable for the purpose intended, may be based on the molecular weight of the resins herein employed, or in a manner analogous to those obtained, for example, from difunctional phenols and aldehydes. For instance, in discussing this same problem in our aforementioned co-pending application Serial No. 8,730, we stated as follows:

"For instance, the molecular weight of the internal structural units of the resin of the following over-simplified formula:

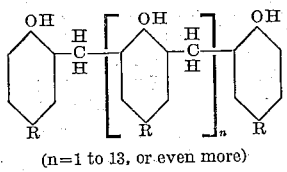

(n=1 to 13, or even more)

is given approximately by the formula: (Mol. wt. of phenol −2) plus mol. wt. of methylene or substituted methylene radical. The molecular weight of the resin would be $n$ times the value for the internal unit, plus the values for the terminal units. The left-hand terminal unit of the above structural formula, it will be seen, is identical with the recurring internal unit, except that it has one extra hydrogen. The right-hand terminal unit lacks the methylene bridge element. Using one internal unit of a resin as the basic element, a resin's molecular weight is given approximately by taking ($n$ plus 2) times the weight of the internal element. Where the resin molecular has only 3 phenolic nuclei, as in the structure shown, this calculation will be in error by several percent; but as it grows larger, to contain 6, 9 or 12 phenolic nuclei, the formula comes to be more than satisfactory. Using such an approximate weight, one need only introduce, for example, two molal weights of ethylene oxide, or slightly more, per phenolic nucleus, to produce a product of minimal hydrophile character. Further oxyalkylation gives enhanced hydrophile character. Although we have prepared and tested a large number of oxyethylated products of the type described herein, we have found no instance where the use of less than 2 moles of ethylene oxide per phenolic nucleus gave desirable products."

In the present instance, depending upon the raw material employed, or whether or not pretreatment or after-treatment with acetylene is involved, one could make a somewhat comparable calculation at least to obtain an approximation of the molecular weight.

Ordinarily, the oxyalkylation is carried out in autoclaves provided with agitators or stirring devices. We have found that the speed of the agitation markedly influences the time of reaction. In some cases, the change from slow speed agitation, for example, in a laboratory autoclave agitation with a stirrer operating at a speed of 60 to 200 R. P. M., to high speed agitation, with the stirrer operating at 250 to 350 R. P. M., reduces the time required for oxyalkylation by about one-half to two-thirds. Frequently, xylene-soluble products which give insoluble products by procedures employing comparatively slow speed agitation, give suitable hydrophile products when produced by similar procedure, but with high speed agitation, as a result, we believe of the reduction in the time required with consequent elimination or curtailment of opportunity for curing or etherization. Even if the formation of an insoluble product is not involved, it is frequently advantageous to speed up the reaction, thereby reducing production time, by increasing agitating speed. In large scale operations, we have demonstrated that economical manufacturing results from continuous oxyalkylation, i. e., an operation in which the alkylene oxide is continuously fed to the reaction vessel, with high speed agitation, i. e., an agitator operating at 250 to 350 R. P. M. Continuous oxyalkylation, other conditions being the same, is more rapid than batch oxyalkylation, but the latter is ordinarily more convenient for laboratory operation.

EXAMPLE 1d

The resin employed was a commercial resin sold under the trade name "Koresin," a product of the General Aniline & Film Corporation, and previously described. This resin, as previously noted, is derived from acetylene and para-tertiary butylphenol. 200 grams of this resin were dissolved in 200 grams of xylene. 4 grams of sodium methylate were added. The mixture was placed in a conventional autoclave equipped with stirring device, thermometer, pressure gauge, etc. 100 grams of ethylene oxide were added. The mixture was allowed to react for 3¾ hours. This time the temperature employed was 140° C. The maximum gauge pressure was 130 pounds per square inch. At the completion of the reaction the pressure dropped with the disappearance of the ethylene oxide, due to reaction, so that the pressure represented the vapor pressure of xylene and nothing more. The product at the end of this period was a yellowish liquid, somewhat emulsifiable.

Another 100 grams of ethylene oxide were added, and during this second period of reaction, the time employed was 4½ hours, maximum temperature 150° C., and maximum gauge pressure 105 pounds per square inch. At the end of this period, the reaction mass had an appearance similar to that previously described. It did show greater emulsifiability by virtue of the fact that it mixed with water to form a milky emulsion.

A third addition of 100 grams of ethylene oxide was then made, and the time required for this reaction period was 3½ hours. Temperature employed was 150° C. The maximum gauge pressure was 115 pounds per square inch. At the end of this period the product showed greater water solubility than before.

The fourth addition of ethylene oxide was then made equal to 100 grams. This required 3 hours for a period of reaction. The temperature employed was 150° C. and the maximum gauge pressure was 90 pounds. At the end of this period the product mixed with water to give almost a clear solution.

The final addition of 100 grams of ethylene oxide was made, requiring three hours' time, a temperature of 164° C., and a pressure of 75 pounds. The product obtained was an amber-colored oil, completely soluble in water. It will be noted that the weight of the final product was 900 grams, ratio of ethylene oxide to resin was 2.5 to 1, and the percent of xylene in the final product was about 22%.

EXAMPLE 2d

The resin employed was that obtained by treating Koresin as previously described, for instance, see Example 1c, and elsewhere, by after-treatment with formaldehyde. The resin was the specific resin described under the heading of Example 1c. 159 grams of this formaldehyde-treated Koresin were mixed with 121 grams of xylene. To this mixture were added 3 grams of sodium methylate. The mixture was then oxyethylated in an autoclave, using conventional equipment in the manner described under Example 1d, preceding, and elsewhere. The first addition of ethylene oxide was 50 grams. The time required for reaction was 3½ hours. The maximum temperature employed was 145° C. The gauge pressure was 120 pounds per square inch. At the end of the reaction period the product showed an incipient tendency to emulsify.

A second addition of 50 grams of ethylene oxide was then made. This required 2½ hours at a maximum temperature of 160° C., and a gauge pressure of 120 pounds. The product at the end of this time was definitely more water-emulsifiable and the product of reaction was a somewhat viscous amber-colored liquid.

A third addition of 50 grams of ethylene oxide was then made. This required two hours' time and a maximum temperature of 147° C. and a pressure of 115 pounds. At the end of this addition, the product was still somewhat viscous and tended to dissolve in water and then curd out.

The fourth addition of 50 grams of ethylene oxide was then made, reqiuring 2½ hours at a temperature of 147° C. and a maximum gauge pressure of 100 pounds. At the end of this period the product was still viscous and still had a tendency to curd out in water.

A fifth addition of ethylene oxide was then made and the product obtained was still an amber-colored liquid, definitely viscous, and still showed some tendency to curd out in water, but this property was definitely reduced. This fifth period required five hours for addition of the ethylene oxide, at a temperature of 150° C. and maximum gauge pressure of 109 pounds.

A sixth addition of ethylene oxide was then made in which the period of time required was even longer than before, to wit, 6¾ hours. The temperature employed was 150° C., and the gauge pressure was distinctly higher again, to wit, 123 pounds. The product was a viscous, amber liquid, almost completely water-soluble.

A seventh addition of ethylene oxide was then made which required six hours at a temperature of 154° C., and a pressure of 116 pounds. The product obtained was an amber-colored liquid, distinctly water-soluble, particularly in dilute solution, and contained approximately 20% xylene.

EXAMPLE 3d

The same reactants and procedure were employed as in Example 1d, preceding, except that propylene oxide was employed instead of ethylene oxide. The resultant, even on the addition of the alkylene oxide in the weight proportions of the previous example, has diminished hydrophile properties, in comparison with the resultants of Example 1d. This illustrates the point that propylene oxide and butylene oxide give products of lower levels of hydrophile properties than does ethylene oxide.

EXAMPLE 4d

The same reactants and procedure were employed as in Example 2d, preceding, except that propylene oxide was employed instead of ethylene oxide. The resultant, even on the addition of the alkylene oxide in the weight proportions of the previous example, has diminished hydrophile properties, in comparison with the resultants of Example 2d. This illustrates the point that propylene oxide and butylene oxide give products of lower levels of hydrophile properties than does ethylene oxide.

EXAMPLE 5d

The same reactants and procedure were followed as in Example 1d, except that one mole of glycide was employed initially per hydroxyl radical. This particular reaction was conducted with extreme care and the glycide was added in small amounts representing fractions of a mole. Ethylene oxide was then added, following the procedure of Example 1d, to produce products of greater hydrophile properties. We are extremely hesitant to suggest even the experimental use of glycide and methylglycide, for the reason that disastrous results may be obtained even in experimentation with laboratory quantities.

EXAMPLE 6d

The same reactants and procedure were folowed as in Example 2d, except that one mole of glycide was employed intially per hydroxyl radical. This particular reaction was conducted with extreme care and the glycide was added in small amounts representing fractions of a mole. Ethylene oxide was then added, following the procedure of Example 2d, to produce products of greater hydrophile properties. We are extremely hesitant to suggest even the experimental use of glycide and methylglycide, for the reason that disastrous results may be obtained even in experimentation with laboratory quantities.

In the latter part of our experimentation in preparing resins of the kind herein described, we adopted a procedure of using nitrogen gas to force ethylene oxide into the autoclave continuously, instead of adding it batch-wise. In these particular experiments, approximately 200 grams of the resin, of the kind exemplified by previous examples, are mixed with an equal weight of a solvent, such as xylene, and sodium methylate added equivalent to 2% of the resin. The reaction mass was mixed, raised to the desired temperature of reaction of approximately 150° to 170° C. and then ethylene oxide added in a slow rate at approximately 50 to 100 grams per hour. The time required varied from 2 to 4 hours, and as a rule, the pressure stayed below 100 pounds per square inch gauge pressure. At the end of such period the ethylene oxide was completely reacted. The process was interrupted momentarily when the weight of ethylene oxide equal to the original resin was added, and an examination made merely for physical appearance and emulsifiability.

The second stage was then conducted in essentially the same manner using ethylene oxide equal to the weight of the original resin, i. e., at the end of the second stage the amount of ethylene oxide was double the weight of the final resin.

The third addition was conducted in the same manner.

For sake of brevity, the data are presented in tabular outline in the attached table. Such continuous addition of ethylene oxide may be employed, not only in an amount equal to triple the weight of the resin, but quadruple the weight of the resin, and even in substantially higher amounts, six to eight times the weight of the resin. As far as demulsification of other petroleum emulsions of the water-in-oil type are concerned, the range indicated by the table (ethylene oxide equal to one to three times the weight of the resin) is most advantageous. On the other hand, the products obtained may be employed as intermediates and converted into more complicated derivatives, such as the esters of lower or higher fatty acids, reacted with chloroacetic acid and then with tertiary amines, etc. In such instances, it may be desirable to add ethylene oxide equal to 4 to 6 times the weight of the resin.

that of an oil, like castor oil, to that of a thick viscous syrup. Some products are semi-waxy. The presence of a solvent, such as 15% xylene or the like, thins the viscosity considerably and also reduces the color in dilution. No undue significance need be attached to the color, for the reason that if the same compound is prepared in glass and in iron, the latter usually has somewhat darker color. If the resins are prepared as customarily employed in varnish resin manufacture, i. e., a procedure that excludes the presence of oxygen during the resinification and subsequent cooling of the resin, then, of course the initial resin is much lighter in color. We have employed some resins which initially are almost

TABLE

| Resin | Grams | Xylene, in Grams | Na Methylate, in Grams | Continuous Introduction of $C_2H_4O$ equal to wt. of resin | | | |
|---|---|---|---|---|---|---|---|
| | | | | Time, Hours | Max. °C. Temp. | Max. Ga. Press., #/sq. in. | Solubility |
| Ex. 12 | 200.0 | 200.0 | 4.0 | 2-4 | 145 | 150 | |
| Ex. 16 | 200.0 | 200.0 | 4.0 | 1½ | 145 | 145 | |
| Ex. 17 | 200.0 | 200.0 | 4.0 | 2 | 137 | 135 | |
| Ex. 18 | 200.0 | 200.0 | 4.0 | 3 | 145 | 142 | |
| Ex. 1b | 200.0 | 200.0 | 4.0 | 4 | 151 | 138 | |
| Ex. 2b | 200.0 | 200.0 | 4.0 | 4½ | 150 | 142 | Distinctly soluble to emulsifiable in all instances. |
| Ex. 3b | 200.0 | 200.0 | 4.0 | 3½ | 158 | 140 | |
| Ex. 4b | 200.0 | 200.0 | 4.0 | 4 | 147 | 135 | |
| Ex. 1c | 200.0 | 200.0 | 4.0 | 4 | 150 | 130 | |
| Ex. 2c | 200.0 | 200.0 | 4.0 | 4 | 148 | 128 | |
| Ex. 3c | 200.0 | 200.0 | 4.0 | 3½ | 150 | 130 | |
| Ex. 4c | 200.0 | 200.0 | 4.0 | 4 | 150 | 130 | |
| Ex. 5c | 200.0 | 200.0 | 4.0 | 2½ | 147 | 138 | |

| | Second Stage $C_2H_4O$ to double weight of resin | | | | Third Stage $C_2H_4O$ to triple weight of resin | | | | |
|---|---|---|---|---|---|---|---|---|---|
| | Time (hours) | Max. °C. Temp. | Max. Ga. Press., #/sq. in. | Solubility | | Time (hrs.) | Max. °C. Temp. | Max. Ga. Press., #/sq. in. | Solubility |
| Ex. 12 | 2½ | 150 | 150 | | Ex. 12 | 2-4 | 138 | 170 | |
| Ex. 16 | 3¾ | 155 | 182 | | Ex. 16 | 2-1½ | 151 | 182 | |
| Ex. 17 | 4 | 145 | 135 | | Ex. 17 | 2-2½ | 160 | 148 | |
| Ex. 18 | 3½ | 148 | 160 | | Ex. 18 | 4 | 144 | 160 | |
| Ex. 1b | 4½ | 142 | 138 | Distinctly soluble to almost clear. | Ex. 1b | 3½ | 137 | 178 | Clear or completely soluble in almost every case. Slight turbidity in a few instances. |
| Ex. 2b | 2½ | 151 | 180 | | Ex. 2b | 4½ | 150 | 180 | |
| Ex. 3b | 2 | 148 | 140 | | Ex. 3b | 5¼ | 155 | 190 | |
| Ex. 4b | 3 | 137 | 195 | | Ex. 4b | 3½ | 155 | 195 | |
| Ex. 1c | 3½ | 150 | 130 | | Ex. 1c | 2-4 | 161 | 185 | |
| Ex. 2c | 4 | 147 | 142 | | Ex. 2c | 3½ | 142 | 142 | |
| Ex. 3c | 4½ | 142 | 130 | | Ex. 3c | 3 | 180 | 156 | |
| Ex. 4c | 4 | 147 | 178 | | Ex. 4c | 4¼ | 172 | 178 | |
| Ex. 5c | 5 | 144 | 138 | | Ex. 5c | 2½ | 163 | 148 | |

The resins, prior to oxyalkylation, vary from tacky, viscous liquids, to hard, high-melting solids. Their color varies from a light yellow through amber, to a deep red or even almost black. In the manufacture of resins, particularly hard resins, as the reaction progresses, the reaction mass frequently goes through a liquid state to a sub-resinous or semi-resinous state, often characterized by being tacky or sticky, to a final complete resin. As the resin is subjected to oxyalkylation, these same physical changes tend to take place in reverse. If one starts with a solid resin, oxyalkylation tends to make it tacky or semi-resinous, and further oxyalkylation makes the tackiness disappear and changes the product to a liquid. Thus, as the resin is oxyalkylated, it decreases in viscosity, i. e., becomes more liquid or changes from a solid to a liquid, particularly when it is converted to the water-dispersible or water-soluble stage. The color of the oxyalkylated derivative is usually considerably lighter than the original product from which it is made, varying from a pale straw color to an amber or reddish amber. The viscosity usually varies from water-white and also yield a lighter colored final product.

Actually, in considering the ratio of alkylene oxide to add, and we have previously pointed out that this can be predetermined, using laboratory tests, it is our actual preference, from a practical standpoint, to make tests on a small pilot plant scale. Our reason for so doing is that we make one run, and only one, and that we have a complete series which shows the progressive effect of introducing the oxyalkylating agent, for instance, the ethyleneoxy radicals. Our preferred procedure is as follows: We prepare a suitable resin, or, for that matter, purchase it in the open market. We employ 8 pounds of resin and 4 pounds of xylene and place the resin and xylene in a suitable autoclave with an open reflux condenser. We prefer to heat and stir until the solution is complete.

If such resins are used, a solvent need not be added, but may be added as a matter of convenience or comparison, if desired. We then add a catalyst, for instance, 2% of caustic soda, in the form of a 20% to 30% solution, and remove the water of solution or formation. We then shut off the reflux condenser and use the equipment as an autoclave only, and oxyethylate until a total of 60 pounds of ethylene oxide have been added, equivalent to 750% of the original resin. We prefer a temperature of about 150° C. to 175° C. We also take samples at intermediate points, as indicated in the following table:

| Percentage | Pounds of Ethylene Oxide Added per 8-pound Batch |
| --- | --- |
| 50% | 4.0 |
| 66⅔ | 5.33 |
| 75 | 6.0 |
| 100 | 8.0 |
| 150 | 12.0 |
| 200 | 16.0 |
| 300 | 24.0 |
| 400 | 32.0 |
| 500 | 40.0 |
| 600 | 48.0 |
| 750 | 60.0 |

Oxyethylation to 750% can usually be completed within 30 hours and frequently more quickly.

The samples taken are rather small, for instance, 2 to 4 ounces, so that no correction need be made in regard to the residual reaction mass. Each sample is divided in two. One-half the sample is placed in an evaporating dish on the steam bath overnight so as to eliminate the xylene. Then 1.5% solutions are prepared from both series of samples, i. e., the series with xylene present and the series with xylene removed.

Mere visual examination of any samples in solution may be sufficient to indicate hydrophile character or surface-activity, i. e., the product is soluble, forming a colloidal sol, or the aqueous solution foams or shows emulsifying property. All these properties are related through adsorption at the interface, for example, a gas-liquid interface or a liquid-liquid interface. If desired, surface-activity can be measured in any one of the usual ways using a Du Nouy tensiometer or dropping pipette, or any other procedure for measuring interfacial tension. Such tests are conventional and require no further description. Any compound having sub-surface-activity, and all derived from the same resin and oxyalkylated to a greater extent, i. e., those having a greater proportion of alkylene oxide, are useful for the practice of this invention.

Another reason why we prefer to use a pilot plant test of the kind above described, is that we can use the same procedure to evaluate the susceptibility of the resin to oxyethylation. As previously pointed out, the resin employed, whether produced from acetylene alone or produced from acetylene followed by after-treatment with an aldehyde, or vice-versa, must be fusible and organic solvent-soluble. During the oxyethylation step any insolubility or cross-linking which appears and is sufficient to destroy minimum surface-active properties may be accounted for by any one of a number of reasons, but, as stated, the most likely reasons are cross-linking or etherification. If a pilot plant test of the kind previously described has been employed and the product is soluble throughout the various stages, needless to say, practically all operating information required is available.

It may be well to call attention to one result which may be noted in a long, drawn-out oxyalkylation, particularly oxyethylation, which would not appear in a normally conducted reaction. Reference has been made to cross-linking and its effect on solubility and also to the fact that, if carried far enough, it causes incipient stringiness, then pronounced stringiness, usually followed by a semi-rubbery or rubbery stage. Incipient stringiness, or even pronounced stringiness, or even the tendency towards a rubbery stage, is not objectionable, so long as the final product is still hydrophile and at least sub-surface-active. Such material frequently is best mixed with a polar solvent, such as alcohol or the like, and preferably, an alcoholic solution is used. The point which we want to make here, however, is this: Stringiness or rubberization at this stage may possiby be the result of etherification. If one starts with an organic solvent-soluble resin which is also fusible, it must be substantially free from rigid cross-linking, and if such resin molecule is oxyalkylated so as to introduce a plurality of hydroxyl groups in each molecule, then and in that event, if subsequent etherification takes place, one is going to obtain cross-linking in the same general way that one would obtain cross-linking in other resinification reactions. Ordinarily, there is little or no tendency towards etherification during the oxyalkylation step. If it does take place at all, it is only to an insignificant and undetectable degree. However, suppose that a certain weight of resin is treated with an equal weight of, or twice its weight of, ethylene oxide. This may be done in a comparatively short time, for instance, at 150° or 175° C. in 4 to 8 hours, or even less. On the other hand, if in an exploratory reaction, such as the kind previously described, the ethylene oxide were added extremely slowly in order to take step-wise samples, so that the reaction required 4 or 5 times as long to introduce an equal amount of ethylene oxide employing the same temperature, then etherification might cause stringiness or a suggestion of rubberiness. For this reason if in an exploratory experiment of the kind previously described there appears to be any stringiness or rubberiness, it may be well to repeat the experiment and reach the intermediate stage of oxyalkylation as rapidly as possible and then proceed slowly beyond this intermediate stage. The entire purpose of this modified procedure is to cut down the time of reaction so as to avoid etherification if it be caused by the extended time period.

It may be well to note one peculiar reaction sometimes noted in the course of oxyalkylation, particularly oxyethylation, of the thermoplastic resins herein described. This effect is noted in a case where a thermoplastic resin has been oxyalkylated, for instance, oxyethylated, until it gives a perfectly clear solution, even in the presence of some accompanying water-insoluble solvent such as 10% to 15% of xylene. Further oxyalkylation, particularly oxyethylation, may then yield a product which, instead of giving a clear solution as previously, gives a very milky solution suggesting that some marked change has taken place. One explanation of the above change is that the structural unit indicated in the following way where $8n$ is a fairly large number, for instance, 10 to 20, decomposes and an oxyalkylated resin representing a lower degree of oxyethylation and a less soluble one, is generated and a cyclic polymer of ethylene oxide is produced, indicated thus:

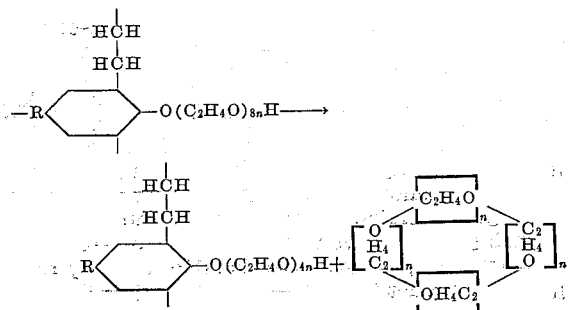

This fact, of course, presents no difficulty for the reason that oxyalkylation can be conducted in each instance stepwise, or at a gradual rate, and samples taken at short intervals so as to arrive at a point where optimum surface activity or hydrophile character is obtained if desired; for products for use in the practice of this invention, this is not necessary and, in fact, may be undesirable, i. e., reduce the efficiency of the product.

We do not know to what extent oxyalkylation produces uniform distribution in regard to phenolic hydroxyls present in the resin molecule. In some instances, of course, such distribution can not be uniform for the reason that we have not specified that the molecules of ethylene oxide, for example, be added in multiples of the units present in the resin molecule. This may be illustrated in the following manner:

Suppose the resin happens to have five phenolic nuclei. If a minimum of two moles of ethylene oxide per phenolic nucleus are added, this would mean an addition of 10 moles of ethylene oxide, but suppose that one added 11 moles of ethylene oxide, or 12, or 13, or 14 moles; obviously, even assuming the most uniform distribution possible, some of the polyethyleneoxy radicals would contain 3 ethyleneoxy units and some would contain 2. Therefore, it is impossible to specify uniform distribution in regard to the entrance of the ethylene oxide or other oxyalkylating agent. For that matter, if one were to introduce 25 moles of ethylene oxide there is no way to be certain that all chains of ethyleneoxy units would have 5 units; there might be some having, for example, 4 and 6 units, or for that matter 3 or 7 units. Nor is there any basis for assuming that the number of molecules of the oxyalkylating agent added to each of the molecules of the resin is the same, or different. Thus, where formulae are given to illustrate or depict the oxyalkylated products, distributions of radicals indicated are to be statistically taken. We have, however, included specific directions and specifications in regard to the total amount of ethylene oxide, or total amount of any other oxyalkylating agent, to add.

In regard to solubility of the resins and the oxyalkylated compounds, and for that matter derivatives of the latter, the following should be noted. In oxyalkylation, any solvent employed should be non-reactive to the alkylene oxide employed. This limitation does not apply to solvents used in cryoscopic determinations for obvious reasons. Attention is directed to the fact that various organic solvents may be employed to verify that the resin is organic solvent-soluble. Such solubility test merely characterizes the resin. The particular solvent used in such test may not be suitable for a molecular weight determination and, likewise, the solvent used in determining molecular weight may not be suitable as a solvent during oxyalkylation. For solution of the oxyalkylated compounds, or their derivatives, a great variety of solvents may be employed, such as alcohols, ether alcohols, cresols, phenols, ketones, esters, etc., alone or with the addition of water. Some of these are mentioned hereafter. We prefer the use of benzene or diphenylamine as a solvent in making cryoscopic measurements. The most satisfactory resins are those which are soluble in xylene or the like, rather than those which are soluble only in some other solvent containing elements other than carbon and hydrogen, for instance, oxygen or chlorine. Such solvents are usually polar, semi-polar, or slightly polar in nature compared with xylene, cymene, etc.

In the manufacture of resins employing acetylene as the source of the bridging radical between two or more phenolic nuclei, one need not employ the acetylene after-treatment with resins, but obviously, can use this after-treatment in connection with dimers which are not resins. Ortho-substituted phenols, such as ortho-cresol, ortho-propylphenol, ortho-butylphenol, ortho-amylphenol, ortho-octylphenol, ortho-nonylphenol, etc., can be treated with a reactive ketone, particularly acetone to produce a class of chemicals known as bisphenol, being essentially diphenylol methanes of the following formula:

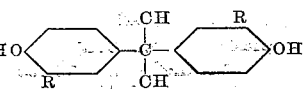

in which R represents an alkyl radical as above indicated.

Similarly, under somewhat different conditions difunctional phenols, such as para-substituted phenols of the kind described in detail previously, cn be treated with an aldehyde, and particularly formaldehyde, so as to give a dimer of the following composition:

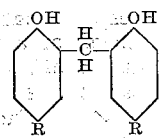

in which the alkyl radical R may have as many as 18 carbon atoms or in which R may be an alicyclic radical, as in the case of methylphenol and cyclohexylphenol, or may be aromatic, as in the case of phenylphenol. Needless to say, such materials can be subjected to after-treatment with acetylene in the same manner that an ordinary phenol or resin can be treated, and thus yield a resinous product in which the unit containing acetylene must include at least 4 phenolic nuclei.

It is unnecessary to point out that organic solvent-soluble, fusible, phenolic resins may be derived not only from acetylene, but also by use of aldehydes and ketones, or both, in combination, as, for example, when bisphenol of the kind just described is treated with an aldehyde, such as formaldehyde. This class of resins includes other resins where the phenolic nuclei are joined by residues other than those enumerated, for instance, a carbon atom chain interrupted by oxygen, as in the case of resins obtained at least in part from dichloroethylether. Such resins are described in the literature and examples included in our aforementioned co-pending application Serial No. 8,723, filed February 16, 1948. Needless to say, all such phenolic resins containing the unaltered phenolic hydroxyl are oxyalkylation-susceptible, due to the lability of the hydrogen atom of the hydroxyl. Reference to the phenolic resins being water-insoluble, is, of course, intended to emphasize the fact that they are made water-soluble or at least hydrophile to the minimum extent described elsewhere herein by the introduction of the alkylene oxide into a hydrophobe resin.

Resins of the kind herein described can be subjected to hydrogenation so as to convert the aromatic compound into the alicyclic analogue. If desired, the final oxyalkylated derivative can be hydrogenated in the same manner. The products so obtained are useful for a wide variety of purposes, where surface-active materials are ordinarily employed, including demulsification. As to such hydrogenation procedure, it is to be noted it is comparable to that described in our co-pending application Serial No. 726,201, filed February 3, 1947, now abandoned.

Reference is made to the last class of resins previously described which are obtained totally or partially from an anacardic acid phenol, either alone, or in combination with difunctional or tri-functional phenols, or both. These are typical resins characterized, for example, by thermoplastic, fusible, cardanol or cashew nutshell liquid resins which are well known. As to specific examples, reference is made to our aforementioned co-pending application Serial No. 8,723, filed February 16, 1948, and also to our two co-pending applications Serial Nos. 35,525 and 36,825, filed June 26, 1948, and July 2, 1948, respectively.

As we pointed out previously, there is an enormous variety of resins which can be prepared using acetylene or an acetylene homologue to supply the joining radical between two or more phenolic nuclei. We have obtained outstanding results in the field of surface-activity, particularly demulsification, by the use of such resins derived from difunctional phenols, or difunctional phenols, in combination with an anacardic acid phenol, such as cardanol, side-chain hydrogenated cardanol, or the like. The third subclass of phenols which we prefer and which are particularly advantageous in their final oxyalkylated forms over others with which we have made comparisons are those derived from:

(1) Difunctional phenols having 4 to 18 carbon atoms in the substituent radical. Such resins are prepared by reaction with acetylene, as indicated;

(2) Resins obtained from the same phenols, but including the prior step of resinification with an aldehyde and then followed by treatment by acetylene; and (3) Acetylene resins, class 1 immediately preceding, followed by after-treatment with aldehyde or an aldehyde homologue.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of our process.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 1d, with 15 parts by weight, of xylene and 10 parts, by weight, of isopropyl alcohol, an excellent demulsifier is obtained. Selection of the solvent will vary, depending upon the solubility characteristics of the oxyalkylated product, and of course, will be dictated in part by economic considerations, i. e., cost.

As noted above, the products herein described may be used not only in diluted form, but also may be used admixed with some other chemical demulsifier. For example, an excellent demulsifying agent can be made by the use of a mixture comprising:

Oxyalkylated derivative, for example, the product of Example 1d, 20%;
A cyclohexylamine salt of a polypropylated naphthalene monosulfonic acid, 24%;
An ammonium salt of a polypropylated naphthalene monosulfonic acid, 24%;
A sodium salt of oil-soluble mahogany petroleum sulfonic acid, 12%;
A high-boiling aromatic petroleum solvent, 15%;
Isopropyl alcohol, 5%.

The above proportions are all weight percents.

Having thus described our invention, what we claim and desire to secure by Letters Patent is:

1. A process for breaking petroleum emulsions of the water-in-oil type, characterized by subjecting the emulsion to the action of a demulsifier including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble, phenolic resin; said resin being derived at least in part by reaction with an acetylenic hydrocarbon so as to introduce an altered acetylenic radical as the linking structure between phenolic nuclei; the amount of acetylenic hydrocarbon reacted being at least sufficient to introduce one acetylenic hydrocarbon-derived bridge per resin molecule; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that the hydrophile properties of said oxyalkylated resin in an equal weight of xylene are sufficient to produce an emulsion when said xylene solution is shaken vigorously with one to three volumes of water.

2. A process for breaking petroleum emulsions of the water-in-oil type, characterized by subjecting the emulsion to the action of a demulsifier including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble, phenolic resin; said resin being derived at least in part by reaction with acetylene so as to introduce an altered acetylenic radical as the linking structure between phenolic nuclei; the amount of acetylene reacted being at least sufficient to introduce one acetylene-derived bridge per resin molecule; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduce for each phenolic nucleus; and with the final proviso that the hydrophile properties of said oxyalkylated resin in an equal weight of xylene are sufficient to produce an emulsion when said xylene solution is shaken vigorously with one to three volumes of water.

3. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide; and (B) an oxyethylation susceptible, fusible, organic solvent-soluble, water-insoluble, phenolic resin; said resin being derived at least in part by reaction with acetylene so as to introduce an altered acetylenic radical as the linking structure between phenolic nuclei; the amount of acetylene reacted being at least sufficient to introduce one acetylene-derived bridge per resin molecule; said oxyethylated resin being characterized by the introduction into the resin molecule of a plurality of divalent radicals having the formula $(C_2H_4O)_n$, wherein $n$ is a numeral varying from 1 to 20, with the proviso that at least 2 moles of ethylene oxide be introduced for each phenolic nucleus; and with the final proviso that the hydrophile properties of said oxyalkylated resin in an equal weight of xylene are sufficient to produce an emulsion when said xylene solution is shaken vigorously with one to three volumes of water.

4. The process of claim 3, wherein the phenolic reactant employed for resinification is at least in part a hydrocarbon-substituted phenol.

5. The process of claim 3, wherein the phenolic reactant employed for resinification is at least in part a hydrocarbon-substituted difunctional phenol.

6. The process of claim 3, wherein the phenolic reactant employed for resinification is a hydrocarbon-substituted difunctional phenol.

7. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide; and (B) an oxyethylation-susceptible, fusible, organic solvent-soluble, water-insoluble, phenolic resin; said resin being derived at least in part by reaction with acetylene so as to introduce an altered acetylenic radical as the linking structure between phenolic nuclei; the amount of acetylene reacted being at least sufficient to introduce one acetylene-derived bridge per resin molecule; said oxyethylated resin being characterized by the introduction into the resin molecule of a plurality of divalent radicals having the formula $(C_2H_4O)_n$, wherein $n$ is a numeral varying from 1 to 20, with the proviso that at least 2 moles of ethylene oxide be introduced for each phenolic nucleus; in said resin the phenolic reactant employed for resinification is a para-substituted alkyl phenol in which the alkyl radical has at least 4 and not over 18 carbon atoms; and with the final proviso that the hydrophile properties of said oxyalkylated resin in an equal weight of xylene are sufficient to produce an emulsion when said xylene solution is shaken vigorously with one to three volumes of water.

8. The process of claim 7, wherein the phenolic resin is derived from the selected phenol and acetylene, solely in absence of any other reactant contributing a resinophore radical.

9. The process of claim 7, wherein the phenolic resin is a phenol-aldehyde resin derived from aldehydes having not over 8 carbon atoms, followed by subsequent after-treatment with acetylene.

10. The process of claim 7, wherein the phenolic resin is a phenol-acetylene resin which has been subjected to subsequent after-treatment with an aldehyde having not over 8 carbon atoms.

MELVIN DE GROOTE.
BERNHARD KEISER.

REFERENCES CITED

The following references are of record in the file of this patent:

UNITED STATES PATENTS

| Number | Name | Date |
|---|---|---|
| 2,076,624 | De Groote | Apr. 13, 1937 |
| 2,430,002 | De Groote et al. | Nov. 4, 1947 |
| 2,454,541 | Bock et al. | Nov. 23, 1948 |